United States Patent
Nakao et al.

(10) Patent No.: US 7,882,747 B2
(45) Date of Patent: Feb. 8, 2011

(54) STRAIN SENSOR AND METHOD FOR MANUFACTURE THEREOF

(75) Inventors: Keiichi Nakao, Osaka (JP); Yukio Mizukami, Fukui (JP); Hiroaki Ishida, Fukui (JP); Koichi Aburata, Fukui (JP)

(73) Assignee: Panasonic Corporation, Osaka (JP)

( * ) Notice: Subject to any disclaimer, the term of this patent is extended or adjusted under 35 U.S.C. 154(b) by 763 days.

(21) Appl. No.: 11/667,968

(22) PCT Filed: Dec. 20, 2005

(86) PCT No.: PCT/JP2005/023333

§ 371 (c)(1),
(2), (4) Date: May 17, 2007

(87) PCT Pub. No.: WO2006/068121

PCT Pub. Date: Jun. 29, 2006

(65) Prior Publication Data

US 2008/0233370 A1    Sep. 25, 2008

(30) Foreign Application Priority Data

Dec. 20, 2004  (JP) .............................. 2004-367163

(51) Int. Cl.
*G01L 1/00*  (2006.01)
(52) U.S. Cl. ....................................................... 73/777
(58) Field of Classification Search .................... 73/777
See application file for complete search history.

(56) References Cited

U.S. PATENT DOCUMENTS

| | | | |
|---|---|---|---|
| 3,486,963 A * | 12/1969 | Smith .......................... 428/410 |
| 5,242,722 A | 9/1993 | Hiraka et al. |
| 5,867,886 A * | 2/1999 | Ratell et al. .................... 29/595 |
| 5,898,359 A * | 4/1999 | Ellis ............................. 338/47 |
| 6,842,970 B2 * | 1/2005 | Schafert et al. ............. 29/621.1 |
| 6,878,464 B2 * | 4/2005 | Moriya et al. ................ 428/632 |
| 2005/0085393 A1 | 4/2005 | Nakao et al. |

FOREIGN PATENT DOCUMENTS

| | | |
|---|---|---|
| EP | 0 561 397 A | 9/1993 |
| EP | 1 439 380 A1 | 7/2004 |
| JP | 4-300249 | 10/1992 |
| JP | 5-45238 | 2/1993 |

(Continued)

OTHER PUBLICATIONS

European Search Report issued in European Patent Application No. EP 05820289.6 dated Mar. 27, 2009.

(Continued)

*Primary Examiner*—Lisa M Caputo
*Assistant Examiner*—Octavia Davis
(74) *Attorney, Agent, or Firm*—McDermott Will & Emery LLP

(57) ABSTRACT

The invention presents a strain sensor includes a substrate, a crystallized glass laminated on the substrate, a strain sensitive resistor laminated on the crystallized glass, in which the crystallized glass is formed by baking a plurality of types of crystallized glass powder having different thermomechanical constants. As a result, the fluctuation of sensor characteristic is decreased, and the cost is lowered.

21 Claims, 12 Drawing Sheets

FOREIGN PATENT DOCUMENTS

| | | |
|---|---|---|
| JP | 05-072017 | 3/1993 |
| JP | 5-93659 A | 4/1993 |
| JP | 6-137805 A | 5/1994 |
| JP | 2979757 B2 | 9/1999 |
| JP | 3033852 B2 | 2/2000 |
| JP | 2003-69236 A | 3/2003 |
| JP | 2005-140515 A | 6/2005 |

OTHER PUBLICATIONS

Chinese Office Action issued in Chinese patent Application No. CN 2005800429891 dated on Sep. 19, 2008.

* cited by examiner

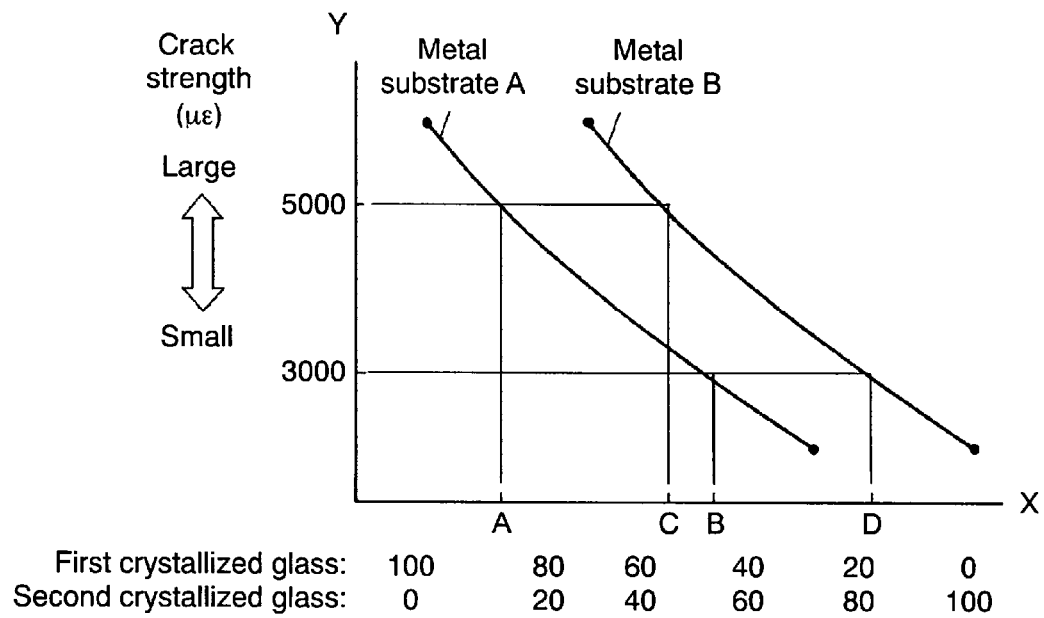
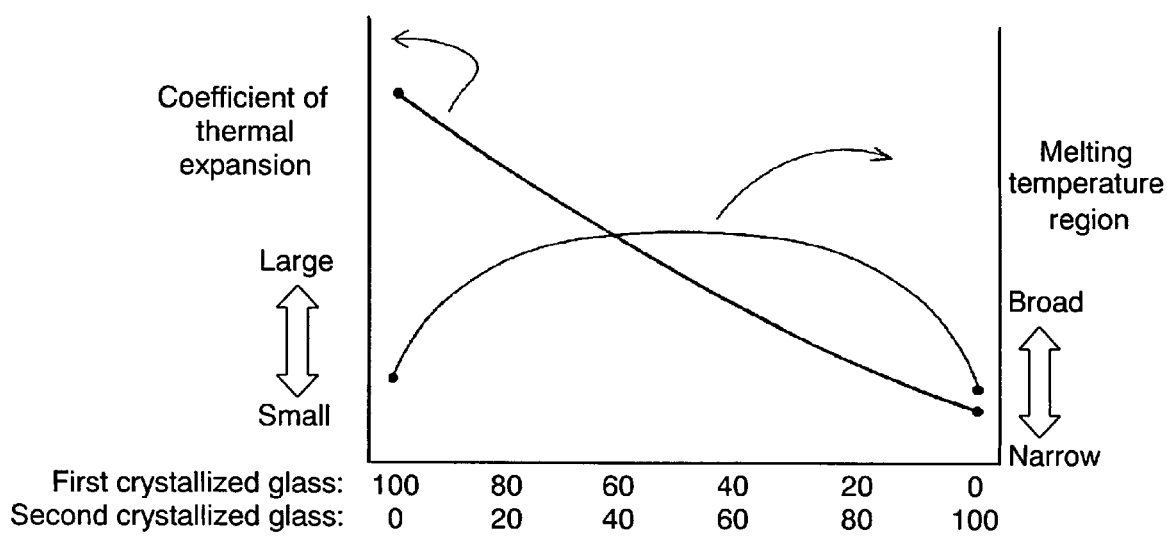

STRAIN SENSOR AND METHOD FOR MANUFACTURE THEREOF

RELATED APPLICATIONS

This application is the U.S. National Phase under 35 U.S.C. §371 of International Application No. PCT/JP2005/023333, filed on Dec. 20, 2005, which in turn claims the benefit of Japanese Application No. 2004-367163, filed on Dec. 20, 2004, the disclosures of which Applications are incorporated by reference herein.

TECHNICAL FIELD

The invention relates to a strain sensor for measuring various loads and torques, and a method of manufacturing the same.

BACKGROUND ART

A conventional strain sensor using a strain sensitive resistor is explained while referring to the drawing. FIG. 18 is a sectional view of a conventional strain sensor. On a metal substrate 1, an electric insulator layer 2 of crystallized glass enamel layer is provided. A strain sensitive resistor 3 is coupled to the metal insulator layer 2, and an overcoat layer 4 is applied, and a load detecting device is composed. A vehicle suspension using such load detecting device is disclosed in Japanese Patent Publication No. 2929757. However, the surface of crystallized glass is rough and is not small, and is large in fluctuations of resistance value as disclosed in Japanese Patent Application Laid-Open No. 6-137805.

FIG. 19 is a partial sectional view of crystallized glass before baking. The crystallized glass before baking is known to be composed of glass powder particles 5. The glass powder particles 5 are baked at specified temperature, and an electric insulator layer 2 is formed.

FIG. 20 is a magnified sectional view of crystallized glass. In FIG. 20, fine asperities are left over on the surface 6 of electric insulator layer 2, and voids 7 are included inside. Such voids 7 are generally contained in a ceramic electronic component. Not having direct effects on reliability of products, such voids may lead to characteristic fluctuations and other problems of products. Such problems are explained below by referring to FIG. 21.

FIG. 21 is a diagram showing baking conditions when baking crystallized glass by using meshbelt conveyor furnace (MCF). In FIG. 21, the axis of abscissas denotes the time and the axis of ordinates represents the temperature. The sample is gradually heated in the MCF from room temperature until once reaching a specified peak temperature of about 900° C., and is gradually cooled to room temperature. In FIG. 21, Temp1 on the Y-axis shows the softening temperature of crystallized glass, and Temp2 corresponds to the crystallizing temperature.

In the case of a general noncrystalline glass, the glass is softened more and more when reaching higher temperature by exceeding the softening temperature (glass softening starting temperature, generally determined by TDA) and the softening point. In the case of crystallized glass, the glass begins to be softened around the softening point (Temp1 in FIG. 21), but the glass is crystallized when reaching the softening temperature (Temp2 in FIG. 21). Accordingly, the softening temperature range of crystallized glass ranges between softening temperature at Temp1 and crystallizing temperature at Temp2. In FIG. 21, the time corresponding to Temp1 and Temp2 is Time1 and Time2 on the X-axis. In other words, the crystallized glass begins to be softened at Time1 (corresponding to softening temperature at Temp1), and is crystallized and solidified at Time2 (corresponding to crystallizing temperature at Temp2). The melting temperature of crystallized glass after crystallization is over 1000° C. Accordingly, the crystallized glass after once being crystallized is not melted at peak temperature (about 900° C. in FIG. 21), and maintains its solid state. That is, in baking profile 8 in FIG. 21, in the initial stage up to Time1, the crystallized glass remains in unbaked state composed of glass powder 5 as shown in FIG. 19. From Time1 to Time2, the glass powder 5 is melted simultaneously, and after Time2, it is solidified as crystallized glass.

Thus, the crystallized glass is melted only between Time1 and Time2, and a sufficient leveling (surface smoothing) time is needed when melting the crystallized glass. Accordingly, for baking stably, it is hard to shorten the baking time. As a result, the production efficiency was low in baking process.

Further, when forming crystallized glass integrally on a metal substrate, baking shrinkage of crystallized glass occurs only in the Z-direction (thickness direction). Baking shrinkage is impeded in the XY direction (that is, the side contacting with the metal substrate). As a result, unlike various products made from general crystallized glass materials (since three-dimensional shrinkage in XYZ direction is possible, stress occurring in baking process is likely to be uniform), technical difficulty is high for optimizing the baking condition of crystallized glass in the case of such configuration. That is, in this configuration, it was a difficult problem to shorten the baking time of crystallized glass.

DISCLOSURE OF THE INVENTION

The invention presents a strain sensor including a substrate, crystallized glass laminated on the substrate, and a strain sensitive resistor laminated on the crystallized glass, in which the crystallized glass is a composite crystallized glass formed by baking a plurality of crystallized glass powder particles having a mutually different thermomechanical constants. In this manner, the melting time and melting temperature range of crystallized glass can be extended, and the productivity in baking process is enhanced, and the cost of the sensor can be lowered.

The invention also presents a manufacturing method of the strain sensor.

BRIEF DESCRIPTION OF THE DRAWINGS

FIG. 7 is a diagram of relation of rate of members for composing composite crystallized glass in the invention, and crack strength of composite crystallized glass on metal substrate.

FIG. 8 is an explanatory diagram of mixing rate of a plurality of glass materials for composing the composite crystallized glass in the invention, coefficient of thermal expansion at this time, and further melting temperature range at this time.

DESCRIPTION OF THE REFERENCE NUMERALS

11 Metal substrate
13 Strain sensitive resistor
14 Overcoat
19 Composite crystallized glass
20 Wiring

DETAILED DESCRIPTION OF THE PREFERRED EMBODIMENTS

Preferred embodiments of the invention are described below while referring to the accompanying drawings. Drawings are schematic diagrams, and are not drawn to correct dimensions. DTA is an abbreviation for differential thermal analysis. Thermomechanical constants in the invention include crystallizing temperature, coefficient of thermal expansion, transition point temperature, and others. Arrows in FIGS. 3, 6A, 6B, and 8 denote the axis of reference.

Preferred Embodiment 1

Figure 1:
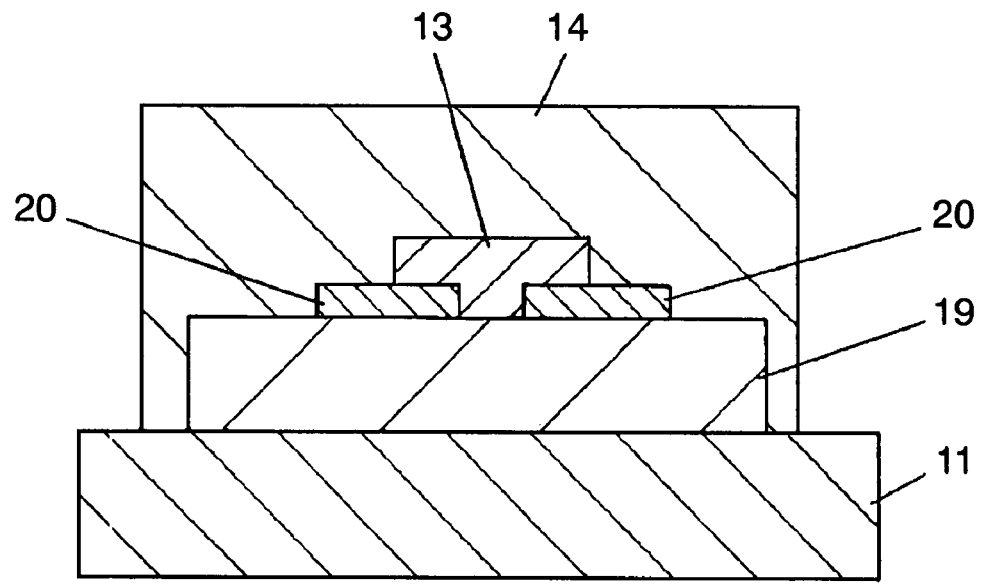
FIG. 1 is a sectional view of sensor in preferred embodiment 1 of the invention.

FIG. 1 is a sectional view of sensor in preferred embodiment 1 of the invention. On a metal substrate 11, a wiring 20 and a strain sensitive resistor 13 are formed by way of a composite crystallized glass 19 (CCG), and they are covered with an overcoat 14.

Figure 2:
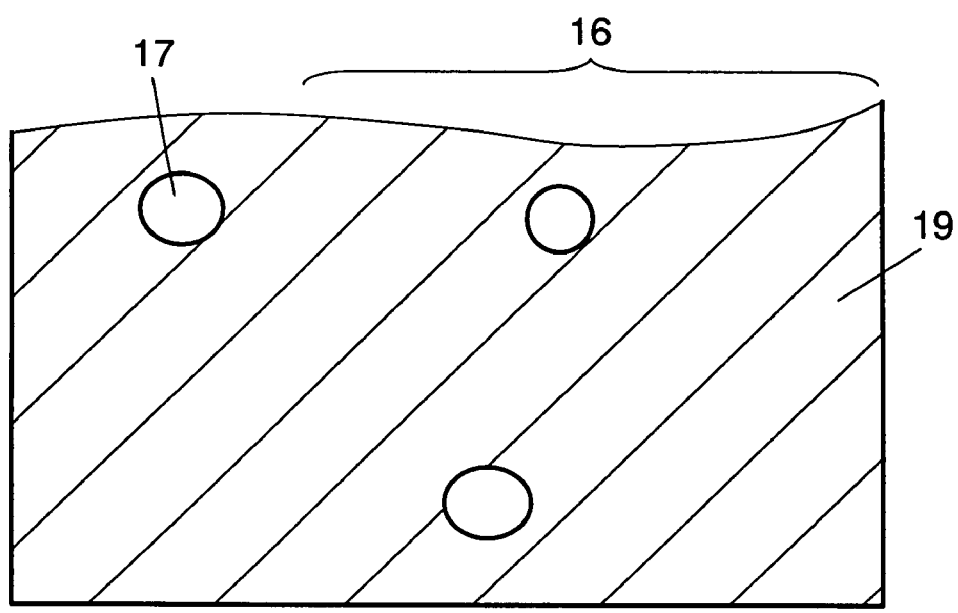
FIG. 2 is a sectional magnified view of composite crystallized glass in the invention.
Figure 20:
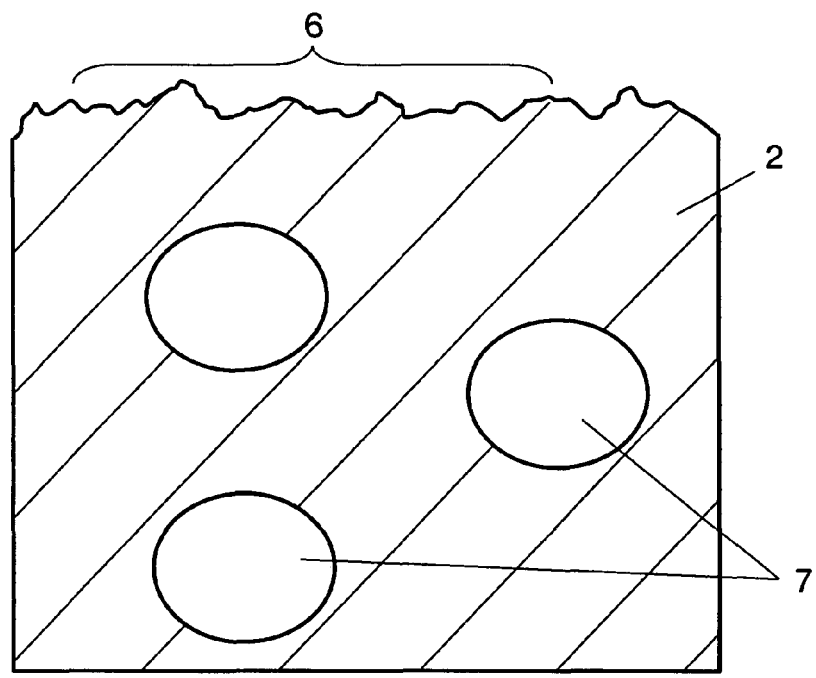
FIG. 20 is a magnified sectional view of crystallized glass in the conventional sensor.
Figure 21:
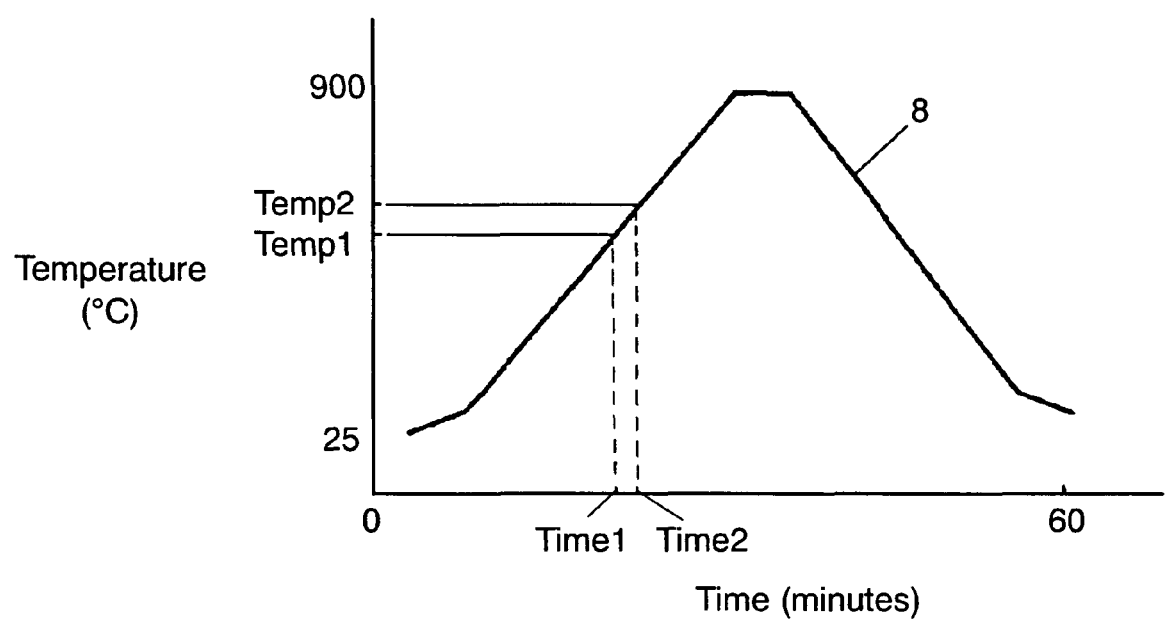
FIG. 21 is a diagram showing baking conditions when baking crystallized glass by using MCF in the conventional sensor.

FIG. 2 is a magnified sectional view of CCG. As compared with FIG. 20 showing a prior art, voids 17 are few and small inside the CCG. The surface 16 of CCG is smooth.

The CCG in the invention is manufactured by mixing a plurality of crystallized glass materials having different softening points and different crystallizing temperatures uniformly in powder state, and baking simultaneously on a metal substrate. As a result, a wide temperature region is obtained (from softening temperature to crystallizing temperature) not obtained in the conventional crystallized glass. Hence, voids 17 are hardly left over inside the CCG as shown in FIG. 2, and the surface 16 is smooth.

Figure 3:
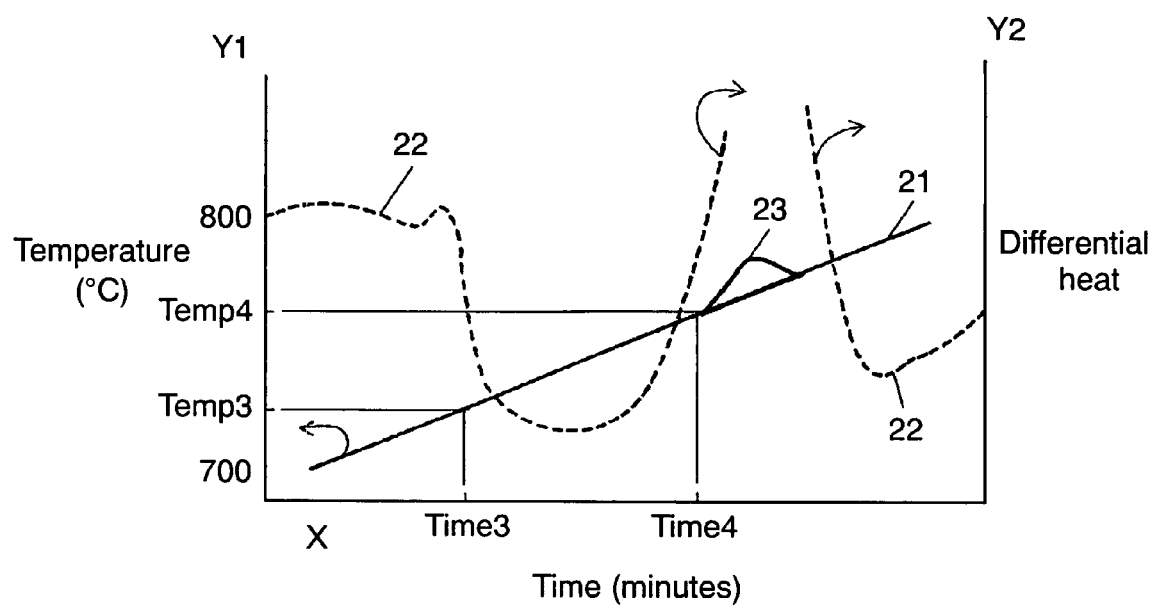
FIG. 3 is a diagram showing an example of DTA result of composite crystallized glass in the invention.

Reasons of decreasing voids and improving the surface by CCG are explained by referring to FIG. 3. FIG. 3 shows an example of result of differential thermal analysis (DTA) of CCG in the invention. The graph of DTA is composed of temperature graph 21 and differential heat graph 22, and has a peak 23. The X-axis denotes the time, the Y1 axis shows the temperature, and the Y2 axis represents the differential heat. DTA is more specifically described below. First, the DTA of the CCG of the invention was determined as follows. About 500 mg of CCG was taken as a sample, and alpha-alumina was used as reference. At heating rate of 10° C./min, differential heat was measured from room temperature to 1000° C. FIG. 3 shows excerpts of results of measurement from about 700 to 800° C., and the temperature graph 21 shows temperature rise from about 700° C. to about 800° C. In temperature graph 21, peak 23 is observed. Modes of softening and baking of CCG are explained. In FIG. 3, the differential heat graph 22 is constant at low temperature side, but a sudden decline is recorded around Time3. Temperature at Time3 is Temp3, which corresponds to softening temperature of CCG.

Further, the differential heat graph 22 once declines for a specific time after Time3, and hikes sharply around Time4 (projecting from the graph frame in FIG. 3). Temperature at Time4 corresponds to the crystallizing temperature of CCG. After Time4, the differential heat graph 22 is largely outside of the graph frame. This is due to crystallizing heat of CCG, and this crystallizing heat is observed as peak 23 in the temperature graph 21.

The CCG being crystallized while generating crystallizing heat at Time4 is stabilized, and is not changed substantially after Time4. In the case of CCG of the invention, the difference between Temp3 (softening temperature) corresponding to the glass fluidity region and Temp4 (crystallizing temperature) is larger than in the conventional crystallized glass. As a result, a sufficient time is allowed until the crystallized glass is melted, crystallized and smoothed.

Figure 4:
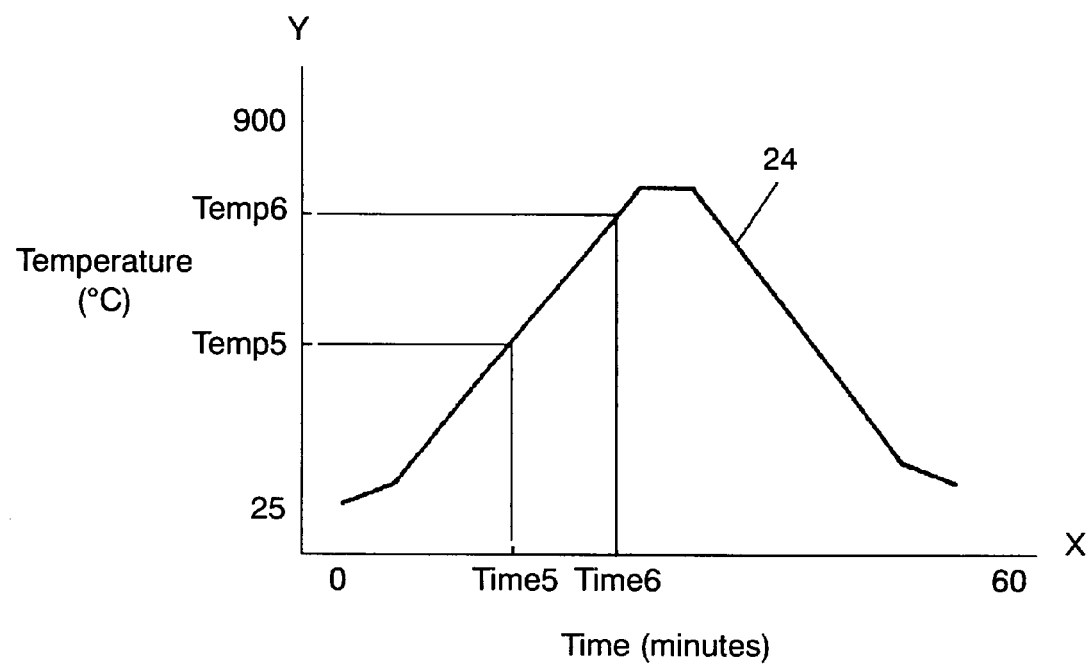
FIG. 4 is a diagram of baking profile of composite crystallized glass in the invention.

Referring now to FIG. 4, baking profile 24 of CCG in MCF is explained. In FIG. 4, the X-axis denotes the time and the Y-axis represents the temperature.

As shown in FIG. 4, the CCG formed in a specified pattern on the metal substrate is gradually heated from room temperature in the MCF, and brought to a peak temperature of about 900° C. for a specific time, and cooled gradually to room temperature. Temp5 corresponds to the softening point of CCG, and Temp6 to the crystallizing temperature of CCG.

In the case of CCG, from room temperature to Temp5, the temperature (between 0 minute to Time5 on the time axis) is less than the softening temperature (Temp5), and individual glass powder particles are not melted. From Temp5 to Temp6 on the Y-axis (from Time5 to Time6 on the X-axis), individual glass powder particles are dissolved depending on the softening temperature, and crystallized as CCG. At temperature above Temp6 (for 60 minutes from Time6 on the X-axis), the CCG remains in crystallized state. Temp 5 in FIG. 4 corresponds to Temp3 in FIG. 3. Temp6 in FIG. 4 corresponds to Temp4 in FIG. 3.

Figure 5:
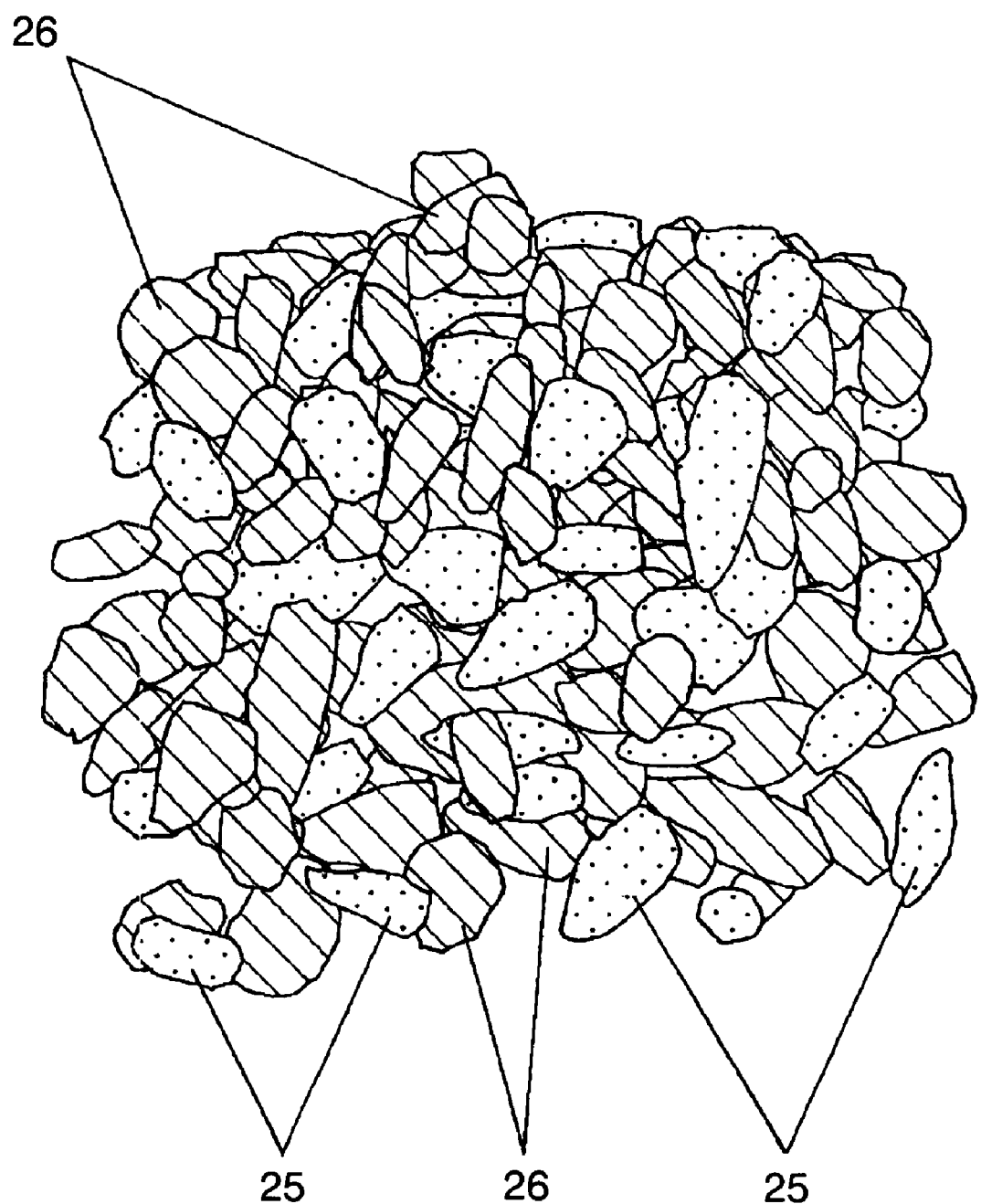
FIG. 5 is a partial sectional view before baking of composite crystallized glass in the invention.

A state before baking of CCG (for example, a state after removal of binder from CCG paste) is shown in FIG. 5. As shown in FIG. 5, it is composed of first crystallized glass powder 25 and second crystallized glass powder 26. The first crystallized glass powder 25 and second crystallized glass powder 26 have mutually different softening temperature and crystallizing temperature. In FIG. 5, the first crystallized glass powder 25 and second crystallized glass powder 26 homogeneously mixed in powder state. A paste composed of these plural types of glass powder having different characteristics is printed on a metal substrate 11 and formed in a specified shape. Further, it is baked in a specified profile as shown in FIG. 4, and CCG 19 is obtained.

The average particle size of first crystallized glass powder 25 and second crystallized glass powder 26 for composing the CCG is preferred to be 0.5 to 10 μm. In particular, if the average particle size of glass powder is less than 0.3 μm, uniform dispersion of glass powder particles may be difficult. When using a single glass powder material, it can be used if the average particle size is 0.1 to 10 μm or less. This is because if fine glass powder particles of about 0.1 to 0.3 μm form aggregates of about 5 to 10 μm (glass powder particles are more likely to form aggregates at less than 0.5 μm), when baked, uniform (same) crystallized glass is obtained.

On the other hand, in the case of CCG 19 of the invention, different glass powder particles are baked at the same time, and it is preferred that the first crystallized glass powder 25 and second crystallized glass powder 26 should be mixed and dispersed uniformly. Accordingly, the average particle size is 0.5 μm or more. If the average particle size of glass powder exceeds 10 μm, in addition to the thickness of CCG, the particle size of glass powder may have an influence. That is, if the average particle size exceeds 10 μm, it is highly possible that the glass powder may contain particles of 20 μm or 30 μm in diameter. Difference in average particle size of first crystallized glass powder 25 and second crystallized glass powder 26 is preferred to be less than 5 μm. In other words, if the difference in average particle size exceeds 5 μm, there may be an influence on the uniformity of the obtained CCG.

Figure 6A:
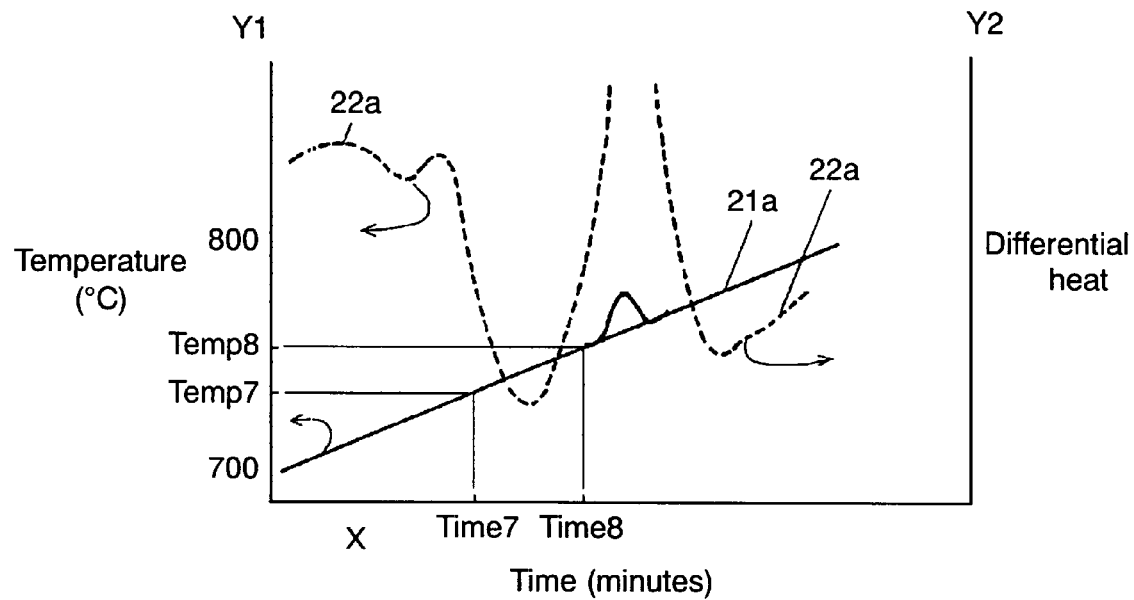
FIG. 6A is a diagram of DTA of a plurality of different crystallized glass materials for composing the composite crystallized glass in the invention.
Figure 6B:
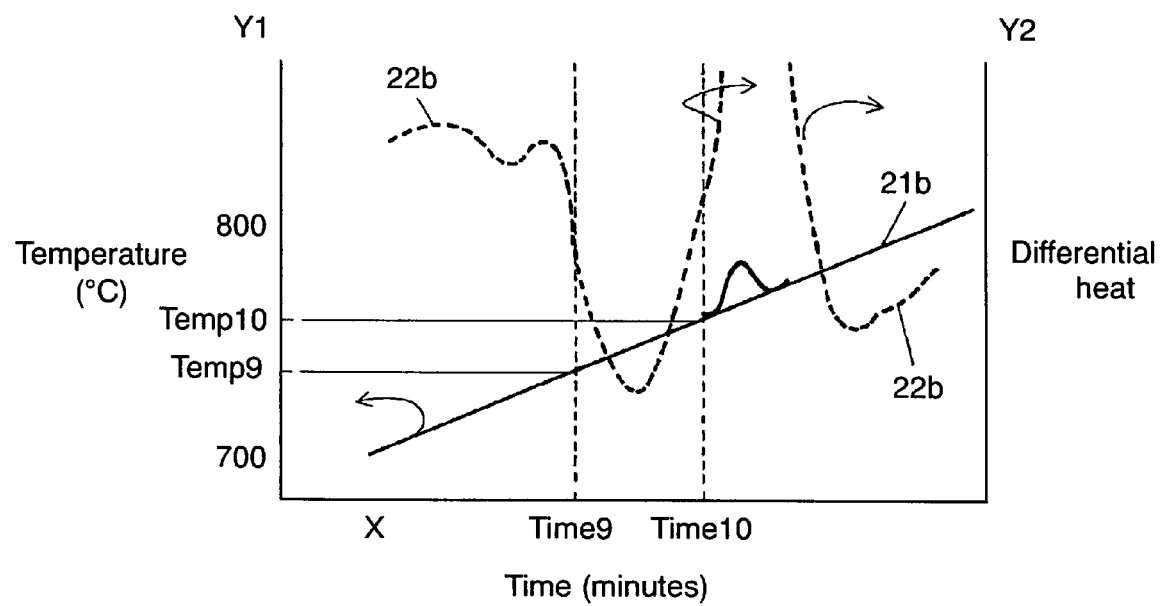
FIG. 6B is a diagram of DTA of a plurality of different crystallized glass materials for composing the composite crystallized glass in the invention.

Referring to FIG. 6, the behavior of individual glass powder particles is explained. FIG. 6A and FIG. 6B are diagrams showing DTA results of plural different types of crystallized glass for composing the CCG. FIG. 6A shows the DTA result of first crystallized glass powder, and FIG. 6B shows the DTA result of second crystallized glass powder. In principle, FIG. 6A and FIG. 6B should be plotted in the same graph, but since the graph becomes complicated, the results are plotted separately in FIG. 6A and FIG. 6B. Since the Y-axis is common, the two graphs may be easily compared. The explanation of axes is same as in FIG. 3 and is hence omitted. The DTA is intended to detect quantitatively changes of thermal energy occurring in the samples. Modes of dissolving or crystallizing of crystallized glass are detected as changes in thermal energy (for example, endothermic phenomenon, exothermic phenomenon).

As shown in FIG. 6A, temperature graph 21a elevates along with the time, and differential heat graph 22a drops suddenly (endothermic effect) around Time7. Temperature at this time (Temp7) corresponds to the softening temperature of first crystallized glass. Around Time8, differential heat graph 22a rises suddenly (exothermic effect), and temperature at this time (Temp8) corresponds to the crystallizing temperature of first crystallized glass.

Similarly, in FIG. 6B, temperature graph 21b elevates along with the time, and differential heat graph 22b drops suddenly (endothermic effect) around Time9, and temperature at this time (Temp9) corresponds to the softening temperature of second crystallized glass. Around Time10, differential heat graph 22b rises suddenly (exothermic effect), and temperature at this time (Temp10) corresponds to the crystallizing temperature of second crystallized glass.

The temperature axes (Y-axes) of FIG. 6A and FIG. 6B are common, and by comparing them mutually, the time axes are sequentially arranged on the same X-axis, and the order is Time7, Time9, Time 8, and Time10. In other words, Time7 corresponds to Temp7, Time 9 to Temp9, Time8 to Temp8, and Time10 to Temp10, and when arranged on the same Y-axis (temperature axis), the ascending sequence of temperature is in the order of Temp7 (softening temperature of first glass), Temp9 (softening temperature of second glass), Temp8 (crystallizing temperature of first glass), and Temp10 (crystallizing temperature of second glass).

These plural types of glass powder different in differential heat graph are mixed and baked in batch as shown in FIG. 5, and hence the fluidity region of CCG of the invention is expanded in a wide range from Temp7 (softening temperature of first crystallized glass) to Temp10 (crystallizing temperature of first crystallized glass).

Results in FIG. 6A and FIG. 6B are combined and shown in FIG. 3. Thus, when forming a glass layer on a metal substrate, if formed as a CCG layer, its baking region can be expanded. As a result, the baking speed in MCF can be raised, and a thicker layer can be baked in batch as compared with the conventional process of baking in several divided steps (or plural layers) because of difficulty in batch baking, and the manufacturing cost of products can be lowered.

Different glass powder materials for composing the CCG have different crystallizing temperatures depending on the compositions, and are not crystallized in batch at same temperature. In particular, when glass powder materials composing crystallized glass show a single differential heat graph, upon reaching the crystallizing temperature, a huge amount of heat is generated (crystallizing heat) along with crystallizing phenomenon. Such crystallizing heat may be propagated to adjacent glass powder, and sudden crystallization may take place in chain reaction.

In the invention, however, by using glass powder materials having different crystallizing temperatures, temperature region of occurrence of crystallizing heat can be expanded, and glass power is formed in fine particles, and generation of crystallizing heat is reduced, and by mixing different glass powder materials, the crystallizing heat becomes uniform on the whole, and a moderate reaction is realized. In FIG. 3, temperature graph 21 shows peak 23 attributable to crystallizing heat, and this is because the thermal capacity is small in the measuring pan (not shown) of the DTA apparatus measuring the temperature graph 21. Thus, the section and inside of CCG 19 are as shown in FIG. 2. The sensor using the CCG shows features of crystallized glass (high strength, high electric insulation), and a sufficient time for smoothing is obtained, and it is also excellent in surface smoothness. As a result, fluctuations of characteristics of the sensor can be decreased, and the sensor characteristics can be stabilized.

Preferably, thickness of CCG 19 is 10 to 100 μm. If the thickness is less than 10 μm, it may have effects of rough surface of metal substrate 11. If exceeding 100 μm, there may be effects on material cost of products.

Plural types of crystallized glass powder having different compositions for composing the CCG are preferably heated and crystallized together with the metal substrate at temperature of 500 to 900° C. If the crystallizing temperature is less than 500° C., the crystallized glass is special and expensive. If the crystallizing temperature is over 900° C., a special and expensive metal substrate is needed, and the product material cost is increased.

Preferred Embodiment 2

In preferred embodiment 2, an example of composition of CCG is explained by referring to Table 1 to Table 6. In Table 1 to Table 6, the rate of components is expressed by percentage by weight (wt. %). Evaluation is indicated by ○, Δ, X, respectively excellent, approved, and rejected.

TABLE 1

|  | No. 1 | No. 2 | No. 3 | No. 4 | No. 5 | No. 6 |
|---|---|---|---|---|---|---|
| MgO | 10 | 20 | 30 | 40 | 50 | 60 |
| $B_2O_3$ | 0-5 | 0-5 | 0-5 | 0-5 | 0-5 | 0-5 |
| $SiO_2$ | 0-5 | 0-5 | 0-5 | 0-5 | 0-5 | 0-5 |
| BaO | 3-25 | 3-25 | 3-25 | 3-25 | 3-25 | 3-25 |
| $Al_2O_3$ | 0 | 0 | 0 | 0 | 0 | 0 |
| Single sintering performance | X | X | X | X | X | X |
| Sintering performance on metal substrate | X | X | X | X | X | X |
| Result | X | X | X | X | X | X |

TABLE 2

|  | No. 7 | No. 8 | No. 9 | No. 10 | No. 11 | No. 12 |
|---|---|---|---|---|---|---|
| MgO | 10 | 20 | 30 | 40 | 50 | 60 |
| $B_2O_3$ | 5-30 | 5-30 | 5-30 | 5-30 | 5-30 | 5-30 |
| $SiO_2$ | 0-5 | 0-5 | 0-5 | 0-5 | 0-5 | 0-5 |
| BaO | 3-25 | 3-25 | 3-25 | 3-25 | 3-25 | 3-25 |
| $Al_2O_3$ | 1-30 | 1-30 | 1-30 | 1-30 | 1-30 | 1-30 |
| Single sintering performance | X | X | Δ | Δ | Δ | X |
| Sintering performance on metal substrate | X | X | X | X | X | X |
| Result | X | X | X | X | X | X |

TABLE 3

|  | No. 13 | No. 14 | No. 15 | No. 16 | No. 17 | No. 18 |
|---|---|---|---|---|---|---|
| MgO | 30 | 35 | 45 | 55 | 60 | 70 |
| $B_2O_3$ | 5-30 | 5-30 | 5-30 | 5-30 | 5-30 | 5-30 |
| $SiO_2$ | 10-25 | 10-25 | 10-25 | 10-25 | 10-25 | 10-25 |
| BaO | 0-3 | 0-3 | 0-3 | 0-3 | 0-3 | 0-3 |
| $Al_2O_3$ | 1-30 | 1-30 | 1-30 | 1-30 | 1-30 | 1-30 |
| Single sintering performance | X | Δ | Δ | Δ | X | X |
| Sintering performance on metal substrate | X | X | X | X | X | X |
| Result | X | X | X | X | X | X |

TABLE 4

|  | No. 19 | No. 20 | No. 21 | No. 22 | No. 23 | No. 24 |
|---|---|---|---|---|---|---|
| MgO | 30 | 35 | 45 | 55 | 60 | 70 |
| $B_2O_3$ | 5-30 | 5-30 | 5-30 | 5-30 | 5-30 | 5-30 |
| $SiO_2$ | 10-25 | 10-25 | 10-25 | 10-25 | 10-25 | 10-25 |
| BaO | 3-25 | 3-25 | 3-25 | 3-25 | 3-25 | 3-25 |
| $Al_2O_3$ | 0 | 0 | 0 | 0 | 0 | 0 |
| Single sintering performance | X | Δ | Δ | Δ | X | X |
| Sintering performance on metal substrate | X | X | X | X | X | X |
| Result | X | X | X | X | X | X |

TABLE 5

|  | No. 25 | No. 26 | No. 27 | No. 28 | No. 29 | No. 30 |
|---|---|---|---|---|---|---|
| MgO | 30 | 35 | 45 | 55 | 60 | 70 |
| $B_2O_3$ | 5-30 | 5-30 | 5-30 | 5-30 | 5-30 | 5-30 |
| $SiO_2$ | 10-25 | 10-25 | 10-25 | 10-25 | 10-25 | 10-25 |
| BaO | 3-25 | 3-25 | 3-25 | 3-25 | 3-25 | 3-25 |
| $Al_2O_3$ | 1-30 | 1-30 | 1-30 | 1-30 | 1-30 | 1-30 |
| Single sintering performance | X | ○ | ○ | ○ | X | X |
| Sintering performance on metal substrate | X | ○ | ○ | ○ | X | X |
| Result | X | ○ | ○ | ○ | X | X |

TABLE 6

|  | No. 19 | No. 20 | No. 21 | No. 22 | No. 23 | No. 24 |
|---|---|---|---|---|---|---|
| MgO | 30 | 35 | 45 | 55 | 60 | 70 |
| $B_2O_3$ | 5-30 | 5-30 | 5-30 | 5-30 | 5-30 | 5-30 |
| $SiO_2$ | 10-25 | 10-25 | 10-25 | 10-25 | 10-25 | 10-25 |
| BaO | 3-25 | 3-25 | 3-25 | 3-25 | 3-25 | 3-25 |
| $Al_2O_3$ | 40-60 | 40-60 | 40-60 | 40-60 | 40-60 | 40-60 |
| Single sintering performance | X | X | X | X | X | X |
| Sintering performance on metal substrate | X | X | X | X | X | X |
| Result | X | X | X | X | X | X |

Table 1 to Table 6 show results of matching of crystallized glass having different compositions on the metal substrate. In each table, the adding rate of MgO is changed. The rate of MgO correlates with crystallinity, and a desired rate of MgO is found to be 35 to 55 wt. % as shown in Table 5. Thus, since the coefficient of thermal expansion of MgO is close to that of metal substrate, this material is known to have a close relation to the matching with metal substrate. Various compositions are studied as shown in Table 2 to Table 6.

As a result, it is found that the surface property is lowered when the content of MgO is too high. It is also known that a rate of BaO leads to drop in heat resistance and contact tightness. It is preferred that $Al_2O_3$ should be added in a range of 1 to 30 wt. %. Coexistence of specific amount of MgO and $Al_2O_3$ is known to be important for stabilization of glass. Or, as shown in Table 6, if added excessively, baking is not improved. On the basis of these results, a desired basic composition of crystallized glass to be baked on metal substrate is shown in Table 7.

TABLE 7

| Element | Composition of composite crystallized glass (wt. %) |
|---|---|
| MgO | 35-50 |
| $B_2O_3$ | 10-30 |
| $SiO_2$ | 10-25 |
| BaO | 3-25 |
| $Al_2O_3$ | 1-30 |
| $SnO_2$ | 0.5-5 |
| $P_2O_5$ | 0.1-5 |

In the composition range of crystallized glass shown in Table 7, CCG was fabricated from plural types of crystallized glass different in melting temperature, crystallizing temperature, and transition point (temperature of sudden change in coefficient of thermal expansion of glass). Results are shown in Table 8.

TABLE 8

| Element | Range of first crystallized glass (wt. %) | Range of second crystallized glass (wt. %) |
|---|---|---|
| MgO | 35-50 | 35-50 |
| $B_2O_3$ | 10-30 | 10-30 |
| $SiO_2$ | 10-25 | 10-25 |
| BaO | 3-25 | 3-25 |
| $Al_2O_3$ | 10-30 | 1-10 |
| $SnO_2$ | 0.5-5 | 0.5-5 |
| $P_2O_5$ | 0.1-5 | 0.1-5 |

As shown in Table 8, a desired composition of first crystallized glass is MgO: 35 to 50 wt. %, $B_2O_3$: 10 to 30 wt. %, $SiO_2$: 10 to 25 wt. %, BaO: 3 to 15 wt. %, $Al_2O_3$: 10 to 30 wt. %, $SnO_2$: 0.5 to 5 wt. %, $P_2O_5$: 0.1 to 5 wt. %.

A desired composition of second crystallized glass is MgO: 35 to 50 wt. %, $B_2O_3$: 10 to 30 wt. %, $SiO_2$: 10 to 25 wt. %, BaO: 5 to 25 wt. %, $Al_2O_3$: 1 to 10 wt. %, $SnO_2$: 0.5 to 5 wt. %, $P_2O_5$: 0.1 to 5 wt. %.

In the composition of first crystallized glass and second crystallized glass, by adding at least one element of $B_2O_3$, $SiO_2$, $SnO_2$, and $P_2O_5$ as a common element about the same amount, the manufacturing cost of crystallized glass can be lowered. In particular, as shown in Table 3, by increasing or decreasing three elements of MgO, BaO and $Al_2O_3$, each by a specific rate, plural glass compositions having individual glass characteristics (coefficient of thermal expansion, transition point, melting temperature, crystallizing temperature) could be developed without having adverse effects on the working efficiency of finished CCG (for example, baking temperature in MCF).

In particular, as shown in Table 8, in the composition of first crystallized glass and second crystallized glass, by increasing or decreasing the content of at least one element out of three elements of MgO, BaO and $Al_2O_3$, the melting temperature and crystallizing temperature of each element can be increased or decreased in an appropriate range for the sensor.

In preferred embodiment 2, on the basis of the result in Table 1, plural types of crystallized glass having different properties are fabricated by changing the rate of oxides contained in the crystallized glass, and they are blended. By thus changing the constituent elements of crystallized glass, products of various softening points, crystallizing temperatures, and coefficients of thermal expansion are obtained, and by blending them appropriated in the glass paste, the characteristics of CCG can be improved. Further, in the same basic composition of crystallized glass, by increasing or decreasing the content of BaO, $Al_2O_3$, or MgO, specific softening temperature or crystallizing temperature may be expressed. By mixing and baking them simultaneously, a wider fluidity region can be obtained as compared with single crystallized material glass. As plural types of glass materials for forming the CCG, preferably, the rate of at least one element out of $Al_2O_3$, BaO, and MgO should be different by a rate of 1 to 20 wt. % (or different in rate by 1 to 20 wt. %). These elements, $Al_2O_3$, BaO, and MgO, are essential elements for composing the crystallized glass, and by difference in content of them, the softening temperature or crystallizing temperature can be varied. Also by making use of difference in coefficient of thermal expansion of these elements, the coefficient of thermal expansion of CCG can be also adjusted.

Thus, features of plural glass materials for composing the CCG (baking profile, coefficient of thermal expansion) can be properly combined, and sensors applicable to various substrates and various uses can be realized. If the rate of each element is less than 1 wt. %, difference may be hardly recognized in glass characteristics, or difference may be canceled by fluctuations of composition in glass lot. If the content exceeds 20 wt. %, difference in baking temperature is too significant, batch baking may be disturbed.

As glass materials for composing the CCG, the content of $SiO_2$ or $B_2O_3$ may be varied at a rate of 0.1 to 10 wt. %. By changing the content of $SiO_2$ or $B_2O_3$, the crystallizing temperature or melting point of crystallized glass may be changed effectively. If the difference in content of $SiO_2$ or $B_2O_3$ is less than 0.1 wt. %, it may be in a range of composition fluctuations, and a characteristic as CCG may not be obtained. If the content difference is more than 10 wt. %, they may not be baked in batch as CCG.

Transition point temperature of crystallized glass is preferably 500 to 750° C. If the transition point temperature is less than 500° C., the glass material is special and hard to handle. If the transition point temperature exceeds 750° C., the glass heat treatment temperature is very high, and special heat resistant and expensive materials are needed for baking furnace and metal substrate 11. The transition point is the temperature of sudden change in inclination of thermal expansion curve, corresponding to a change point of glass structure from solid state to liquid state.

In the case of crystallized glass used in the strain sensor of the invention, the transition point is preferably present somewhere at 550 to 700° C. In the case of such glass material, the crystallizing temperature is 700 to 800° C., and hence an ordinary facility can be used, not requiring any special equipment.

Difference in transition point temperature of plural types of crystallized glass is preferred to be 50° C. or less. If the difference in transition point exceeds 50° C., baking may not be uniform. If there is no difference in transition point temperature of plural types of crystallized glass, when there is difference in coefficient of thermal expansion, the coefficient of thermal expansion to the metal substrate 11 in the base layer can be optimized, and the strength of CCG can be enhanced.

The coefficient of thermal expansion of glass powder for composing the CCG is preferred to be in a range of $90 \times 10^{-7}$ to $200 \times 10^{-7}$/° C. In this range, various heat resistant and inexpensive metal members can be used as metal substrate 11. Difference in coefficient of thermal expansion of plural types of crystallized glass is preferred to be $100 \times 10^{-7}$/° C. or less. When exceeding $100 \times 10^{-7}$/° C., if plural different types of glass powder are blended, the difference in coefficient of thermal expansion is too large, and adverse effects may be applied to the baking performance.

Crystallizing temperature of plural types of crystallized glass is preferred to be 500 to 900° C. If crystallizing temperature is less than 500° C., the glass member is special and expensive. If crystallizing temperature is more than 900° C., a special baking furnace is needed. Difference in crystallizing temperature of plural types of crystallized glass is preferred to be 50° C. or less. If exceeding 50° C., difference in temperature of crystallizing temperature may have adverse effects on baking performance.

Preferred Embodiment 3

Preferred embodiment 3 relates to fine adjustment of coefficient of thermal expansion by using plural types of glass material for composing CCG different in coefficient of thermal expansion, by referring to FIG. 7 and FIG. 8.

FIG. 7 is a diagram showing the relation of rate of members for composing CCG, and crack strength of CCG on metal substrate. This is a result of measurement of crack strength of metal substrate A and metal substrate B mutually different in coefficient of thermal expansion.

In FIG. 7, the first crystallized glass and second crystallized glass differ mutually in the coefficient of thermal expansion. As a result, CCG different in coefficient of thermal expansion is formed, and the crack strength at this time is shown. The X-axis shows the mixing rate in wt. % of first crystallized glass and second crystallized glass.

On the X-axis, the first crystallized glass is 80 and the second crystallized glass is 20, and it means that the first crystallized glass is weighed by 80 wt. % and the second crystallized glass is weighed by 20 wt. %, and these materials are kneaded together with a specified resin solution, and a glass paste is obtained, which is baked to form CCG.

The Y-axis denotes the crack strength. On the Y-axis, a horizontal bar is drawn at a position of crack strength of 3000µε, and at a position of crack strength of 5000µε. These are example of limit value (5000µε) and required value (3000µε) required in the product. The limit value and required value may be largely changed depending on the application of the sensor, and may vary also according to the thickness of glass layer.

Crack strength of CCG formed on the metal substrate is measured as follows. A sample (a glass layer of specified thickness formed on a metal substrate of specified size) is set on a specified jig, a commercial foil gauge is adhered to the surface of the sample, and a spindle is applied on the sample, and the strain occurring in the sample is measured.

In FIG. 7, metal substrate A and metal substrate B differ in the coefficient of thermal expansion. The glass composition (mixing rate of first crystallized glass and second crystallized glass) for obtaining the limit crack strength (5000µε) of metal substrate A corresponds to point A on the X-axis. Similarly, the glass rate for obtaining the required crack strength (3000µε) on metal substrate A corresponds to point B.

Thus, in metal substrate A, it is known that the composition rate between point A and point B is appropriate (actually, it is preferred to set near the center of point A and point B, in consideration of measurement fluctuations of crack strength and fluctuations in glass composition or manufacturing process). Depending on the users' needs, the substrate material, thickness, and applications are different. For example, to conform to metal substrate B, the glass rate may be optimized between point C and point D.

FIG. 8 shows the mixing rate of plural glass materials for composing the CCG, the coefficient of thermal expansion at this time, and the melting temperature range at this time. In FIG. 8, the X-axis shows the mixing ratio in wt. % of first crystallized glass and second crystallized glass. The Y1 axis shows the coefficient of thermal expansion of CCG formed by baking the glass material having the composition on the X-axis. Since the coefficient of thermal expansion may vary in the measuring temperature region, it is preferred to measure the coefficient of thermal expansion in measuring temperature region suited to the application.

The Y2 axis shows the melting temperature region of CCG formed by baking the glass material having the composition on the X-axis, and it corresponds to the difference between Temp3 and Temp4 in FIG. 3. The wider the melting temperature region, the slower is the change of changing into CCG by melting and crystallizing of raw materials of crystallized glass powder. As shown in FIG. 8, by mixing plural glass materials, the coefficient of thermal expansion can be changed, and the melting temperature region can be expanded.

In the case of CCG formed by mixing plural glass powder materials and baking at the same time, the rate of glass powder materials to be mixed is preferred in a rang of first crystallized glass: second crystallized glass=5:95 to 95:5. If the first crystallized glass is less than 5 wt. % and the second crystallized glass is in a range of 95 to 100 wt. %, the rate of fine adjustment of expansion of melting temperature region and coefficient of thermal expansion is limited, and the action and effect as CCG may not be obtained.

Preferred Embodiment 4

Preferred embodiment 4 relates to blending of plural types of crystallized glass. That is, any arbitrary materials of crystallized glass are blended, the CCG of the invention is not formed. The crystallized glass is a glass crystallized as a crystal seed is generated during baking, and high strength and high durability characteristic of crystallized glass are expressed. Accordingly, as plural glass materials for composing CCG, if materials having completely different crystal seeds are mixed and crystallized, crystallization may be may be impeded, or specified characteristics may not be obtained.

In such a case, to compose a stable CCG, it is preferred that crystal seeds are common on plural materials of crystallized glass for composing CCG. When baking in batch by mixing plural crystallized glass materials differing in composition, when mutually common crystal seeds are present, the crystallization is not disturbed, and stable baking is possible.

Referring now to FIG. 9, a crystal structure of plural crystallized glass materials for composing CCG is explained. As for crystal structure of crystallized glass, it is preferred to measure the crystallized glass formed by baking at specified temperature by using a commercial X-ray diffraction apparatus (XRD). The XRD is an apparatus for obtaining information about periodicity of atomic and molecular coordination in substance by making use of diffraction phenomenon of pulsation when X-ray is emitted to the substance. Supposing the diffraction plane interval to be D, strength is recognized by X-ray diffraction only in a direction indicated by $2D \sin \theta = n \lambda$ (Bragg's diffraction formula, n being integer, and $\lambda$ being wavelength), and is weak and not observed in other place. It is hence useful as method of identification of crystal substance. In this preferred embodiment, too, by using the XRD, it is useful for identifying the crystal seeds of various glass materials for composing CCG.

Figure 9A:
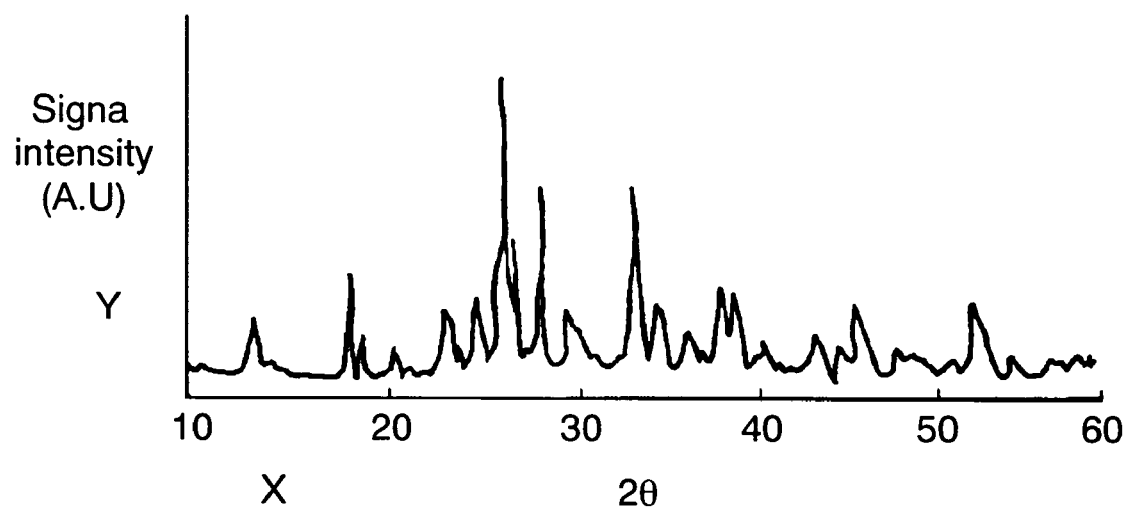
FIG. 9A is an explanatory diagram of mixing rate of a plurality of glass materials for composing the composite crystallized glass in the invention, coefficient of thermal expansion at this time, and further melting temperature range at this time.
Figure 9B:
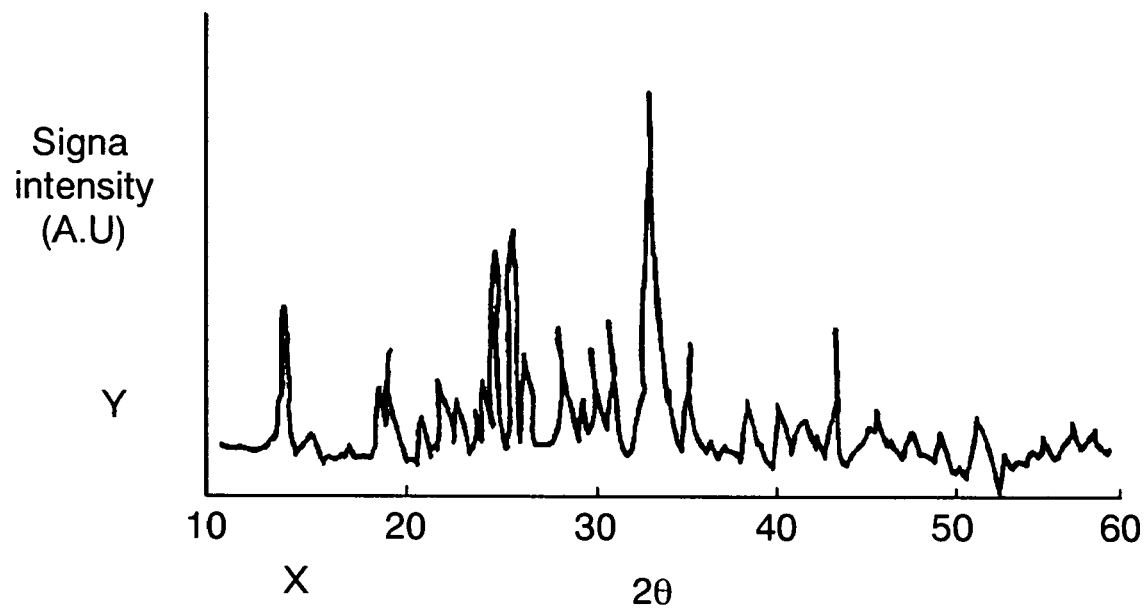
FIG. 9B is an explanatory diagram of mixing rate of a plurality of glass materials for composing the composite crystallized glass in the invention, coefficient of thermal expansion at this time, and further melting temperature range at this time.

FIG. 9A shows the XRD results of first crystallized glass. FIG. 9B shows the XRD results of second crystallized glass. In FIG. 9A and FIG. 9B, the X-axis denotes $2\theta$. The Y-axis represents the signal intensity, and its magnitude is not specified in dimension. From the results in FIG. 6A and FIG. 6B, it is known that each crystallized glass has its own peak, and also has a common peak at 2θ position. As a common crystal seed, $BaMg_2SiO_7$ is preferred. If the crystal seed is $BaMg_2SiO_7$, peaks appear at 2θ positions of 19.7°, 27.5°, and 34.8°.

Thus, when obtaining the CCG by mixing plural crystallized glass materials and baking in batch, it is preferred to have a common crystal seed in the starting materials of crystallized glass. As a result, baking stability is enhanced in batch baking, and it is easier to select starting materials of crystallized glass.

More specifically, first, individual glass materials (first crystallized glass, second crystallized glass, and others) are baked at specified temperature (preferably temperature for sufficiently generating crystal seeds, specifically higher than peak temperature of baking profile 24 shown in FIG. 4), and individual crystallized glass materials are formed. In these crystallized glass materials, and individual diffraction patterns are measured by the XRD.

In the CCG formed by baking plural crystallized glass materials, the crystal seed is preferred to be $BaMg_2SiO_7$, but the atomic ratio of $BaMg_2SiO_7$ is not particularly specified. Anyway, the crystal seed may be formed of basic elements for composing the crystallized glass shown in Table 7. For example, out of three elements of Ba or Mg or B of Si, the crystal seed may be composed of two or more elements.

Preferred Embodiment 5

Figure 10:
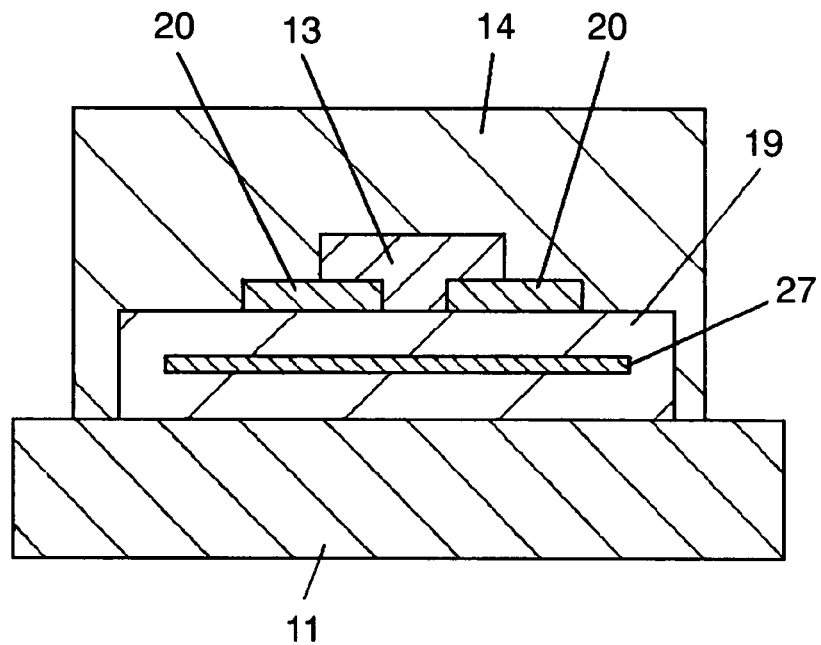
FIG. 10 is a sectional view of sensor incorporating an internal electrode inside of composite crystallized glass in the invention.

In preferred embodiment 5, a mode of enhancing the noise resistance of sensor by using CCG is explained. FIG. 10 is a sectional view of sensor incorporating an internal electrode 27 in the CCG 19. Noise resistance can be improved as follows.

In the case of a sensor forming an insulator layer on a metal substrate of the invention, in particular, the metal substrate is mounted on a specified structure such as automobile chassis by using bolts or the like. Generally, such structure is often a common GND with other circuit parts. Accordingly, depending on the status of use of other circuit parts, the voltage of GND varies, and a high frequency signal may be superposed on the GND. By change of GND voltage, moreover, the output voltage or input voltage may be changed. In such a case, as shown in FIG. 10, an internal electrode 27 is formed in the CCG 19, and by using it as the GND, such adverse effects can be eliminated. The internal electrode 27 is preferably formed of one layer considering from the cost, but it is not limited to one layer. That is, the internal electrode 27 may be formed of one layer or of plural patterns. By dividing the internal electrode 27 into plural divisions, one part may be used for GND and other part for signal, and the sensor is reduced in size and improved in noise resistance.

In FIG. 10, thickness of CCG 19 formed between the metal substrate 11 and internal electrode 27 is preferred to be 10 to 100 μm (that is, when internal electrode 27 is formed in composite crystallized glass 19, total thickness of CCG 19 is preferred to be 20 to 200 μm). If thickness of CCG 19 is less than 10 μm, insulation resistance between metal substrate 11 and internal electrode 27 may be lowered due to effects of surface roughness of metal substrate 11. Thickness of composite crystallized glass 19 formed between internal electrode 27 and wiring 20 or strain sensitive resistor 13 is preferred to be 10 to 100 μm. If less than 10 μm, the insulation resistance may be lowered due to effects of dust or foreign matter mixing in the glass paste or manufacturing process. If thickness of them exceeds 100 μm, the consumption of CCG 19 is increased, and the manufacturing cost is increased.

The internal electrode 27 is, preferably, mainly composed of Ag, and formed in a thickness of 0.5 to 30 μm. If thickness of Ag is less than 0.5 μm, the resistance value after baking is increased, and it may fail to function as internal electrode. If the thickness is over 30 μm, the material cost is increased.

The metal substrate 11 and internal electrode 27 can be connected electrically. The metal substrate 11 and wiring 20 can be connected electrically. The internal electrode 27 and wiring 20 can be connected electrically. For such connection, via holes (not shown in FIG. 10) are formed in the CCG.

Size of via holes is preferably 10 μm to 10 mm. It is hard to form via holes smaller than 10 μm, and via holes larger than 10 mm may have adverse effects on integration of density of patterns. Thus, by connecting electrically the metal substrate 11 or internal electrode 27 to part of the wiring 20 through via holes, noise preventive effect and output stabilizing effect may be obtained when exchanging signals with outside by way of connector (not shown) connected to the wiring 20.

When baking the internal electrode 27 and CCG 19 at the same time, preferably, one or more type of glass powder for forming CCG is preliminarily added in powder state or paste state in the internal electrode paste for forming the internal electrode 27. As a result, when baking the internal electrode paste and CCG paste for forming CCG at the same time, problems due to shrinkage difference, peeling or cracking can be prevented. In particular, in the CCG, if the melting temperature region is expanded, dependence on coefficient of thermal expansion is present, and wide temperature region as in general noncrystalline glass cannot be obtained.

That is, in low temperature region of less than melting temperature region of CCG, as shown in FIG. 5, individual glass powder particles are only contacting with each other, and are weak in strength. If the internal electrode paste is baked and shrunk in this state, weak bonding of glass powder may have adverse effects. Hence, in this region of less than melting temperature region, it is preferred that the internal electrode paste is not baked and shrunk. For the internal electrode paste, accordingly, it is preferred to use a material containing silver powder of high sinter start temperature.

For example, in the case of conventional internal electrode paste mainly composed of Ag powder of average particle size of less than 1 μm, since the sinter start temperature is relatively low, and individual glass powder particles for forming CCG merely contact with each other weakly and overlap with the region less than melting temperature, and crack may be caused. It is preferred to use internal electrode paste mainly composed of Ag powder of average particle size of 1 μm or more.

It is more preferable to select Ag powder of narrower particle size distribution width in an average particle size range of 1 to 5 μm. If fine Ag powder of less than 1 μm is contained in Ag powder, such fine particles may have adverse effects on the sinter start temperature of internal electrode.

Preferred Embodiment 6

Figure 11:
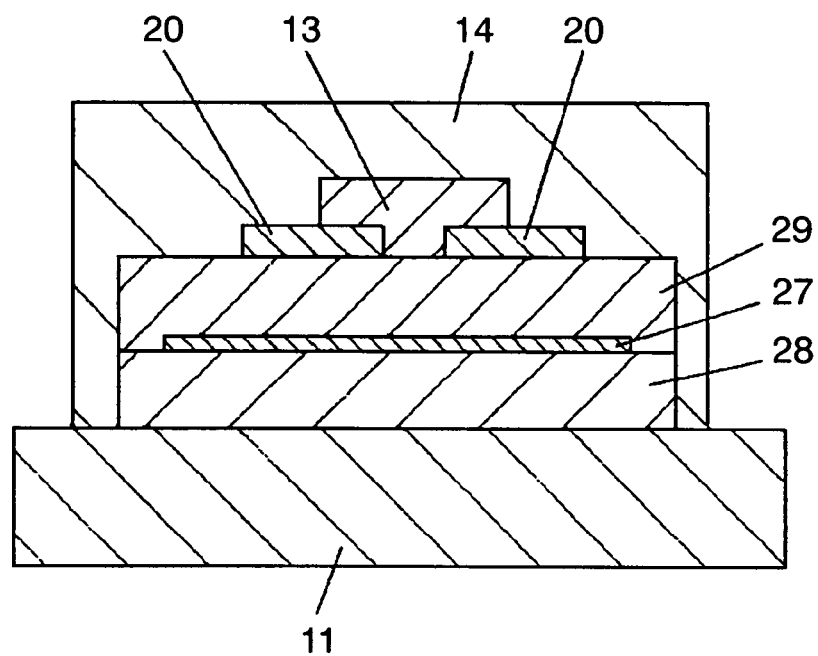
FIG. 11 is a sectional view of sensor using a plurality of different composite crystallized glass materials in the invention.

Preferred embodiment 6 relates to a sensor using plural different types of CCG as shown in FIG. 11. In FIG. 11, an internal electrode 27 is formed between first CCG 28 and second CCG 29, but the internal electrode 27 may not be needed depending on the status of use of the sensor. Or if the internal electrode 27 is formed, it is not always required to form at the interface of first CCG 28 and second CCG 29, and it may formed, for example, in the first CCG 28 or in the second CCG 29.

By forming plural types of CCG in the thickness direction of sensor, optimization design of sensor structure is easy. In FIG. 11, when laminating plural pieces of CCG in multiple layers, the coefficient of thermal expansion is preferably in the order of metal substrate>first composite crystallized glass≧second composite crystallized glass.

If the coefficient of thermal expansion of metal substrate 11 is smaller than that of CCG 28, 29, sufficient crack strength as sensor may not be obtained. When the coefficient of thermal expansion is compared between first CCG 28 and second CCG 29, preferably, the both should be equal in coefficient of thermal expansion, or the first CCG 28 is higher in coefficient of thermal expansion than the second CCG 29. Thus, a compressive stress is generated between the first CCG 28 and second CCG 29, so that the yield strength of the sensor is enhanced.

Preferred Embodiment 7

Figure 12:
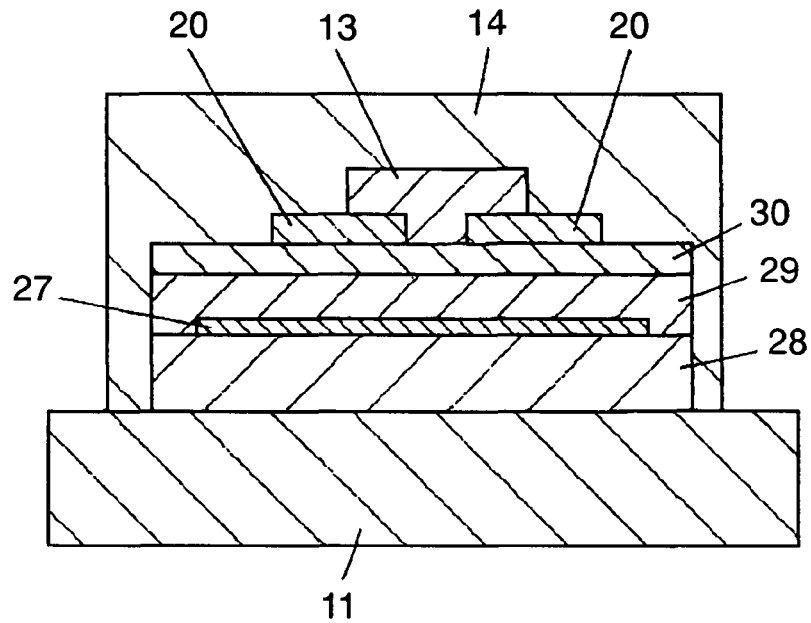
FIG. 12 is a sectional view showing a structure of sensor using both composite crystallized glass and noncrystalline glass in the invention.

Preferred embodiment 7 relates to a sensor using both CCG and noncrystalline glass as shown in FIG. 12. In FIG. 12, at least a strain sensitive resistor 13 is formed on a noncrystalline glass 30, and matching of strain sensitive resistor 13 and second CCG 29 can be improved. In particular, the conventional strain sensitive resistor paste for forming the strain sensitive resistor 13 is often designed to express its characteristic on the noncrystalline glass 30. The conventional strain sensitive resistor paste has its own features, and the resistor can be formed as shown in FIG. 12. In a conventional sensor, for example, the noncrystalline glass 30 is formed directly on the metal substrate 11, and the strain sensitive resistor 13 is formed thereon. In such conventional structure, since noncrystalline glass is used in the insulator layer, the strength may be insufficient. In such conventional sensor structure (for example, the noncrystalline glass 30 is formed directly on the metal substrate 11, and the wiring 20 and strain sensitive resistor 13 are formed thereon), it is hard to incorporate the internal electrode inside of the noncrystalline glass. This is because the noncrystalline glass is softened again by heat treatment when forming the wiring 20 and strain sensitive resistor 13 after forming the internal electrode in the noncrystalline glass, which may lead to occurrence of peeling or cracking in the internal electrode 27. When the internal electrode is incorporated in the crystallized glass, the crystallized glass is not softened again in later process, and such problems do not occur. By newly selecting the structure in FIG. 12, while forming the internal electrode inside, mutual diffusion of second crystallized glass 29 and strain sensitive resistor 13 can be prevented. Referring to Table 9, the composition of noncrystalline glass of high matching with the strain sensitive resistor is explained.

TABLE 9

| Glass component | Composition of noncrystalline glass (wt. %) |
| --- | --- |
| $SiO_2$ | 40-80 |
| CaO | 5-15 |
| PbO | 3-15 |
| $Al_2O_3$ | 1-20 |
| $ZrO_2$ | 1-20 |

When using $RuO_2$ as strain sensitive resistor, PbO glass material is often added in the strain sensitive resistor. By containing a specified amount of PbO also in the base layer of the strain sensitive resistor, it is easy to express the characteristic of the strain sensitive resistor. Or when $SiO_2$ is used as principal component, the glass strength and insulation performance can be enhanced. By further adding CaO, $Al_2O_3$ or PbO, the glass sintering property and fluidity can be enhanced. It is moreover preferred to add a specific amount of $ZrO_2$. Even in the noncrystalline glass composition high in the content of $SiO_2$ (small in coefficient of thermal expansion, about 0.5 ppm/° C.), by adding $Al_2O_3$ (high in coefficient of thermal expansion, about 8.1 ppm/° C.), the coefficient of thermal expansion can be enhanced to the level of metal substrate.

To further enhance in coefficient of thermal expansion, by adding $ZrO_2$ (10.4 in coefficient of thermal expansion) excellent in elasticity and higher in coefficient of thermal expansion than $Al_2O_3$, the coefficient of thermal expansion of noncrystalline glass can be matched further with the metal substrate. If the contents of $Al_2O_3$ or $ZrO_3$ are too high, adverse effects may be caused on the glass sintering temperature or fluidity when melting.

The composition of noncrystalline glass is preferably, as shown in Table 9, composed of $SiO_2$ of 40 to 80 wt. %, CaO of 5 to 15 wt. %, PbO of 3 to 15 wt. %, $Al_2O_3$ of 1 to 20 wt. %, and $ZrO_2$ of 1 to 20 wt. %. If $SiO_2$ is less than 40 wt. %, the sintering property may be impaired. If CaO is less than 5 wt. %, too, the sintering property may not be guaranteed. If PbO is less than 3 wt. %, adverse effects may occur in the resistance value or GF of the strain sensitive resistor to be formed thereon (this is gauge factor, meaning change rate of resistance value to strain, the higher the GF value, the higher is the sensitivity as strain sensitive resistor, and the higher GF value is preferred). If $Al_2O_3$ is less than 1 wt. %, $Al_2O_3$ is also contained in the base layer of CCG, and adverse effects may occur in mutual matching. If $ZrO_2$ is less than 1 wt. %, the coefficient of thermal expansion of noncrystalline glass may be lowered. If $SiO_2$ exceeds 80 wt. %, the melting temperature of glass may be too high. If CaO exceeds 15 wt. %, adverse effects may occur in the sintering property of glass. If PbO exceeds 15 wt. %, adverse effects may occur in the characteristic of the strain sensitive resistor to be formed thereon. If $Al_2O_3$ exceeds 20 wt. %, the glass sintering property may be influenced, and adverse effects may occur in the smoothness of glass surface. If $ZrO_2$ exceeds 20 wt. %, same as in the case of $Al_2O_3$, the glass sintering property may be influenced, and adverse effects may occur in the smoothness of glass surface. As required, $B_2O_3$ may be added to the noncrystalline glass.

In particular, when noncrystalline glass is used in the base layer of strain sensitive resistor, when baking the strain sensitive resistor, the noncrystalline glass of base layer may be melted again (or softened again). Accordingly, when the base layer is made of noncrystalline glass, matching with the strain sensitive resistor is important.

If $SiO_2$ is less than 40 wt. %, adverse effects may be given to the electric characteristic of noncrystalline glass. If $SiO_2$ exceeds 80 wt. %, the sintering temperature may become too high. If PbO is less than 3 wt. %, the characteristic of the strain sensitive resistor containing PbO glass may be influenced. If PbO exceeds 20 wt. %, the melting temperature may be lowered.

Thickness of noncrystalline glass layer (corresponding to noncrystalline glass 30 in FIG. 12) is preferably 5 to 50 μm. If thickness of noncrystalline glass layer is less than 5 μm, there may be adverse effects on pinhole or voids (tiny gaps of several units of μm) of noncrystalline glass. If thicker than 50 μm, the material cost of noncrystalline glass is increased.

Preferred Embodiment 8

Figure 13:
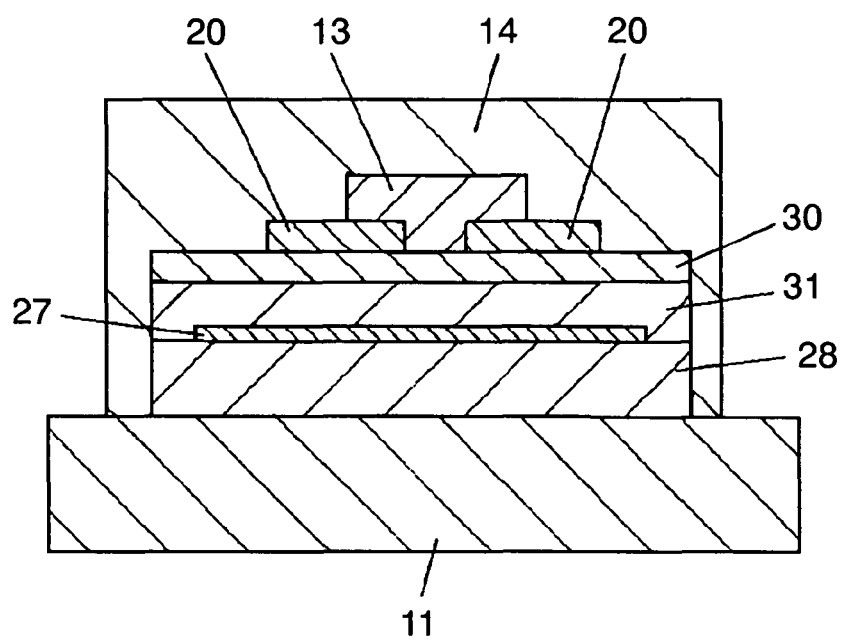
FIG. 13 is a sectional view of sensor improved in matching of noncrystalline glass and composite crystallized glass in the invention.

In preferred embodiment 8, matching of strain sensitive resistor and CCG is explained by referring to FIG. 13. FIG. 13 is a sectional diagram of sensor improved in matching of noncrystalline glass and CCG. A third CCG 31 is formed by simultaneous baking of first CCG 28 and noncrystalline glass 30. Thus, as required, it is preferred to form third CCG 31 by baking crystallized glass and noncrystalline glass at the same time. Thus, the first CCG 28 and noncrystalline glass 30 formed above and beneath the third CCG 31 can be matched. If matching of noncrystalline glass 30 and CCG is difficult, by forming third CCG 31 as intermediate layer, the coefficients of thermal expansion can be mutually matched, and it is easier to optimize and design the stress distribution of various members of the sensor.

By forming such intermediate layer, plural glass layers formed of plural different materials such as first CCG 28 and noncrystalline glass 30 can be easily baked in batch, and the manufacturing cost of products can be lowered. Therefore, when baking plural glass layers formed of plural different materials in batch, difference in sinter shrink behavior due to difference in softening temperature and crystallization among individual layers can be absorbed. As a result, the manufacturing process of products can be stabilized easily, and stable manufacturing is realized.

The third CCG layer 31 may be formed by mixing first CCG paste for forming first CCG 28, and noncrystalline glass paste for forming noncrystalline glass 30 at a specified rate, and printing and baking in specified shape.

Thus, by forming the third CCG 31 between the first CCG 28 and noncrystalline glass 30, the third CCG 31 functions as a kind of buffer layer, and occurrence of thermal stress can be decreased when baking these members in batch.

The rate of crystallization of CCG in the portion contacting with the metal substrate 11 is preferred to be 40% or more to 99% or less. Since the rate of crystallization of CCG in the portion contacting with the metal substrate 11 is 40% or more, if a later process (for example, baking of wiring 20 or strain sensitive resistor 13) is followed by baking process again, since the rate of crystallization is high, it is not melted again, and a high strength is maintained. If the rate of crystallization is less than 30%, when baked in a later process, even the CCG may be melted again in the portion not being crystallized. Depending on the type of metal substrate 11, residual stress of processing may not be completely removed, and there may be an adverse effect on the adhesion strength of metal substrate 11 and CCG. If the rate of crystallization is more than 99%, the crystallization is too sharp. As a result, it is hard to widen the stability condition of baking process by broadening the crystallization by mixing materials different in crystallization condition.

The rate of crystallization can be evaluated by XRD, but it can be also evaluated by observing the sample sectional surface by SEM (scanning electron microscope). In the case of noncrystalline glass, elements can be detected homogeneously if elements are mapped by magnifying the section in a range of about 100 times to 10,000 times. In the case of crystallized glass, however, the section is observed as gathering of crystals having individual fine different compositions. Accordingly, if mapped by elements likely to form crystals (for example, Mg, Si, Ba, Al), the section is observed as an insular gathering of such elements. The ratio of area of such segregated portion (corresponding to crystallized portion) and area of homogeneous portion of all elements (corresponding to noncrystalline portion) is obtained as the rate of crystallization.

Size of glass crystal to be crystallized as CCG is preferred to be 0.1 to 20 µm. If size of glass crystal is less than 0.1 µm, it is too small, and characteristic as crystallized glass may not be obtained. If crystals grow over 20 µm, the size of crystal may be too large for thickness of CCG. Hence, size (diameter or length) of crystal should be ⅓ or less of thickness of insulator layer of CCG.

Preferred Embodiment 9

Figure 14:
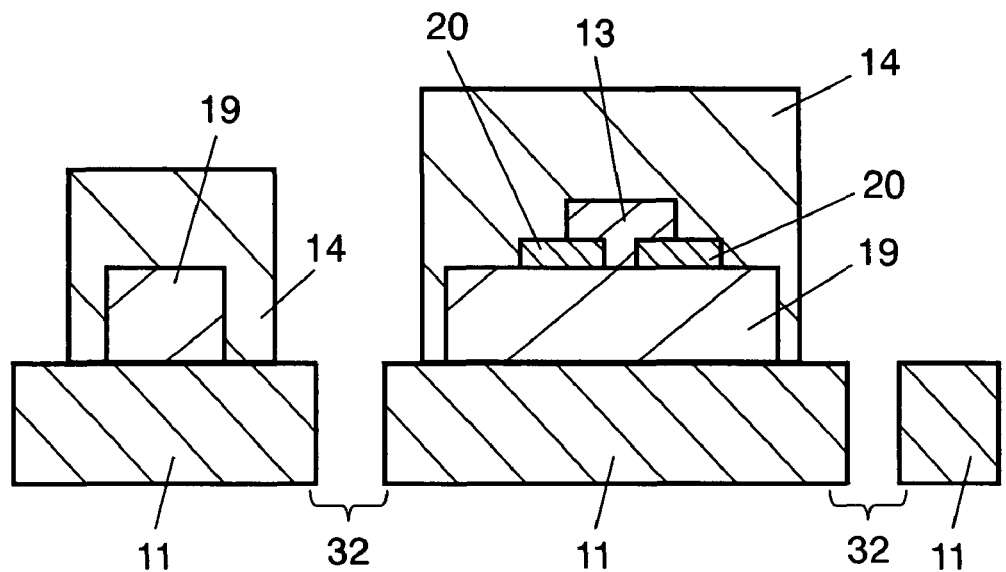
FIG. 14 is a sectional view of sensor using composite crystallized glass in the invention.
Figure 15:
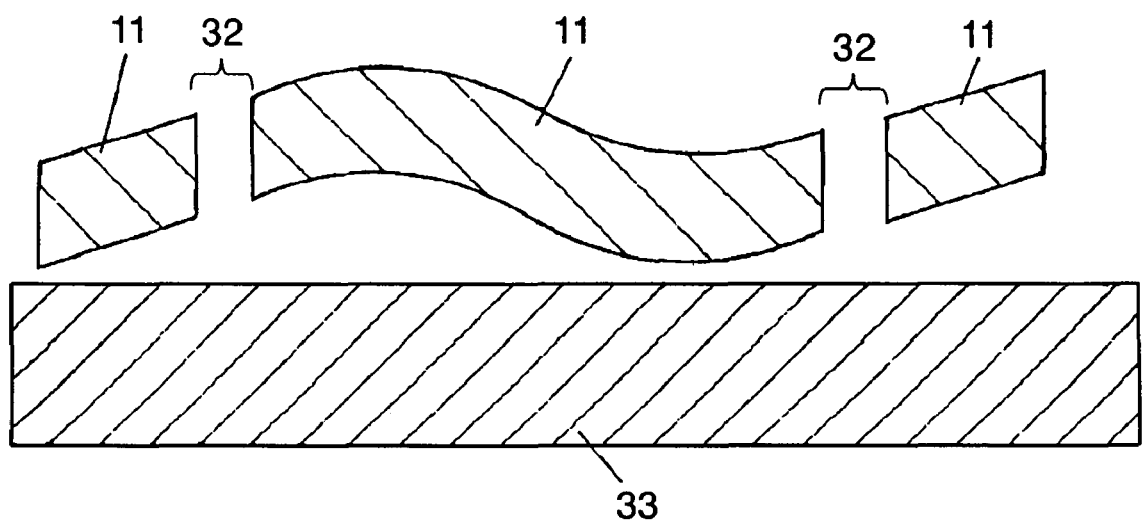
FIG. 15 is a sectional view schematically showing the distortion of metal substrate with a remaining strain in the invention.

In preferred embodiment 9, matching of CCG and metal substrate is explained by referring to FIG. 14 and FIG. 15. FIG. 14 is a sectional view of sensor using CCG, in which holes 32 are formed in metal substrate 11. By forming a plurality of holes 32 in the metal substrate 11, the sensor can be firmly fixed to other structure. To save the cost, holes 32 are preferably formed by blanking or other method before forming the CCG. Accordingly, the CCG 19 is often formed on the metal substrate 11 after processing (complicated forming suited to sensor application or blanking of holes 32). Often complicated strains of processing may be left over on the metal substrate 11, and strains are considered to be different depending on the position on the metal substrate 11 (closer to or remoter from holes 32).

FIG. 15 is a schematic sectional view of warp of metal substrate having residual strains. In FIG. 15, the metal substrate 11 placed on a bench 33 has residual strains from blanking of holes 32 or forming of metal substrate (not shown), and complicated and slight warps may be present on the bench 33. Such warps can be mechanically polished, but cannot be eliminated completely.

Such warps may be left over as undulations in the order of several microns to tens of microns, or hundreds of microns. Such undulations may have complicated effects when forming the CCG 19 integrally on the metal substrate 11. By using CCG in such undulations, it may be effective to decrease undulations and improve the ease of handling of the sensor.

Referring further to FIG. 14, it is attempted to decrease warps around holes 32 by forming CCG 19 around holes 32. The metal substrate is made of a material having coefficient of thermal expansion of 125 ppm/° C. As first crystallized glass powder materials for forming the CCG, a material of 120 ppm/° C. (crystallized glass of $MgO$—$B_2O_3$—$SiO_2$, transition point 630° C.), and a material of 100 ppm/° C. (crystallized glass of $MgO$—$B_2O_3$, transition point 650° C.) were mixed at specified rate, and dispersed in resin solution, and CCG paste was prepared. It is formed around holes 32 as CCG 19 as shown in FIG. 14. In this way, a stress due to difference in coefficient of thermal expansion of CCG 19 and metal substrate 11 is also generated around the holes of the metal substrate 11. By this stress, warps around the holes 32 can be reduced to less than half before processing, and the linearity of sensor output is enhanced at low distortion.

It is not required to form CCG 19 around all of holes 32. By not forming CCG 19 around holes 32, fixing by using bolts and nuts is easier. This is because slight warps or distortion of metal substrate 11 are not serious matter often when designed to fix by using bolts and nuts. On the other hand, in the positions susceptible to strain output (in particular the formed portion of strain sensitive resistor), it is preferred to form CCG 19 as widely as possible (not only near the strain sensitive resistor, but also around the metal substrate 11). Thus, slight strain due to metal substrate 11 can be decreased by the CCG 19 by making use of difference in the coefficient of thermal expansion, and the sensor output can be stabilized highly.

When the surface of CCG 19 is covered with overcoat 14, reliability of CCG material can be enhanced. Overcoat material includes glass material of low melting point, and curable resin material adding ceramic powder as filler. When such curable resin is used, thickness of overcoat layer is preferred to be 10 µm to 10 mm. If thickness of overcoat layer is less than 10 µm, specified reliability may not be obtained. If thickness exceeds 10 mm, the product cost is increased.

As overcoat material, glass may be used. In this case, it is preferred to use a glass material containing PbO by 50 to 95 wt. %. If the content of PbO is less than 50 wt. %, the softening point of overcoat material is too high, and the characteristic of strain sensitive resistor may be disturbed. If the content of PbO is more than 95 wt. %, the glass is likely to be fluidized, and effects may be caused on the shape and dimension of windows (soldering lands) for mounting chip components or semiconductors.

Baking temperature of overcoat material is preferably 300 to 750° C. If baking temperature is less than 300° C., sufficient air tightness may not be obtained. If baking temperature is more than 750° C., the glass is likely to be fluidized, and effects may be caused on the shape and dimension of windows (soldering lands) for mounting chip components or semiconductors.

Thickness of overcoat glass is preferably 10 to 300 µm. If less than 10 µm, pinholes may be formed. If exceeding 300 µm, material cost of product may be increased. If necessary, the overcoat may be formed of plural layers. For example, the first overcoat glass is printed, the second overcoat glass is printed thereon, and these plural layers may be baked in batch to form overcoat glass. Thus, by forming the overcoat glass in plural layers, pinholes may be suppressed, and the product is lowered in cost and heightened in reliability. In this case, too, by defining the PbO content in a range of 50 to 95 wt. % commonly in plural layers of overcoat glass, batch baking is possible. By varying the PbO content and other glass components ($SiO_2$, $TiO_2$, $Cr_2O_3$, etc.) of plural layers of glass, the wettability to the base layer, wet spreading when melting and other properties may be optimized, and the product is enhanced in quality.

Preferred Embodiment 10

Figure 16:
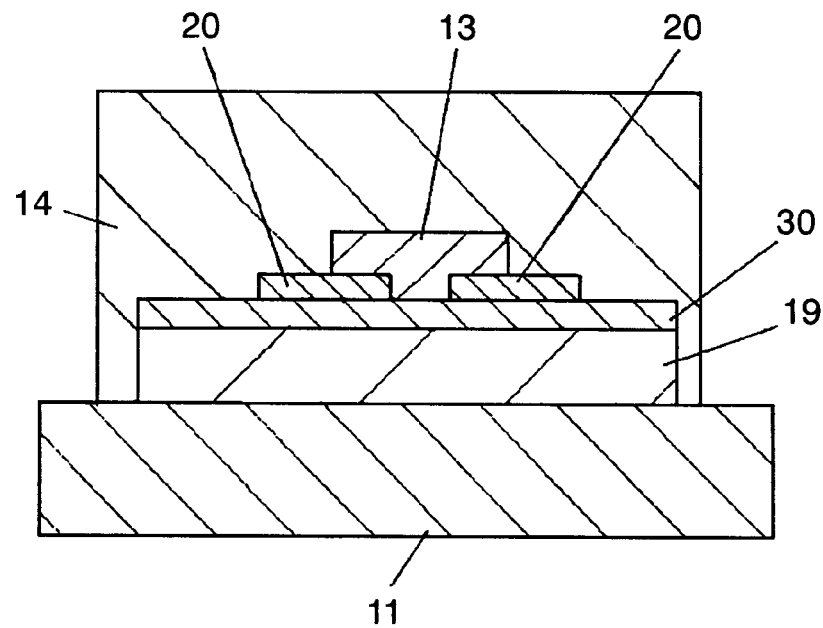
FIG. 16 is a sectional view of sensor using composite crystallized glass and noncrystalline glass in insulator layer in the invention.

In preferred embodiment 10, a strain sensitive resistor is formed on the metal substrate by way of CCG and noncrystalline glass, as shown in FIG. 16. FIG. 16 is a sectional view of sensor using CCG and noncrystalline glass in the insulator layer. On a metal substrate 11, a CCG 19 is formed in a thickness of 10 to 100 µm, and a noncrystalline glass 30 is formed thereon in a thickness of 10 to 100 µm. On the noncrystalline glass 30, a wiring 20 and a strain sensitive resistor 13 are formed, and they are covered with an overcoat 14.

Thus, between the metal substrate 11 and the wiring 20 or strain sensitive resistor 13, an insulator layer composed of plural layers of CCG 19 and noncrystalline glass 30 is formed, and the insulation resistance of metal substrate 11 and the wiring 20 or strain sensitive resistor 13 is enhanced. As a result, if the metal substrate 11 is mounted on an automobile chassis or the like, insulation from the chassis is enhanced, and the sensor output is stabilized.

In particular, when forming the wiring 20 and strain sensitive resistor 13 on the metal substrate 11 by way of noncrystalline glass 30 only, the noncrystalline glass 30 is softened by the heat treatment for forming the wiring 20 and strain sensitive resistor 13, and the insulation property may be lowered. However, by employing the structure in FIG. 16, if a material of low softening point is used as the noncrystalline glass 30, and a material of high forming temperature is used as wiring 20 or strain sensitive resistor 13, the composite crystallized glass 19 is not melted or softened in this temperature range, and the insulation property is not lowered.

Size of metal substrate 11 is free in a range of a square of several millimeters to a square of tens of centimeters. When measuring a strain of a large substrate, the sensor can be fixed to the large substrate by using screws through holes 32 formed in the metal substrate 11 as shown in FIG. 14.

Preferred Embodiment 11

Figure 17:
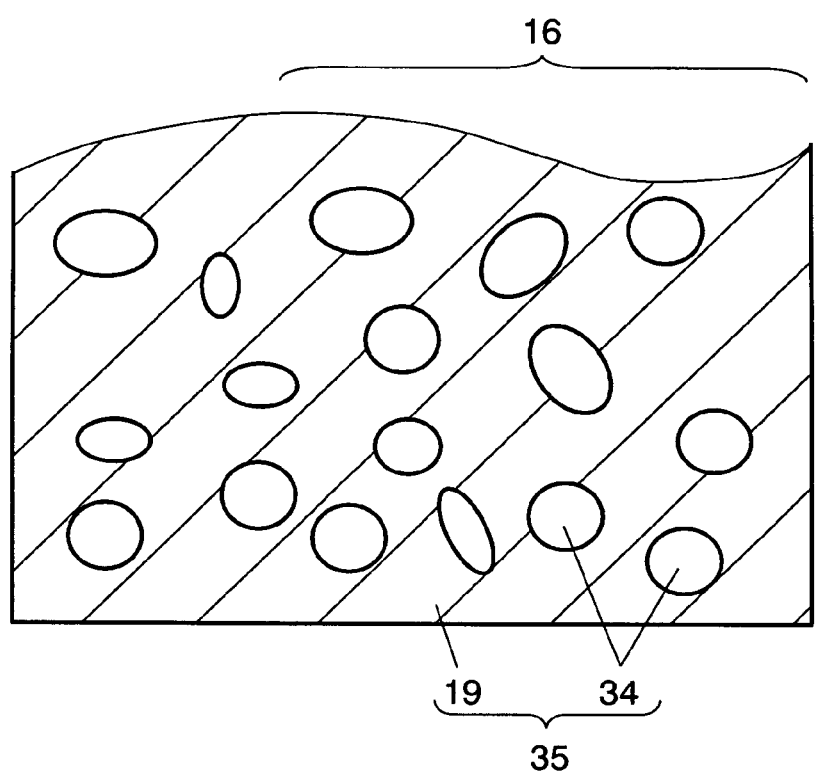
FIG. 17 is a magnified sectional view of composite glass formed by baking composite crystallized glass and ceramic powder at the same time in the invention.
Figure 18:
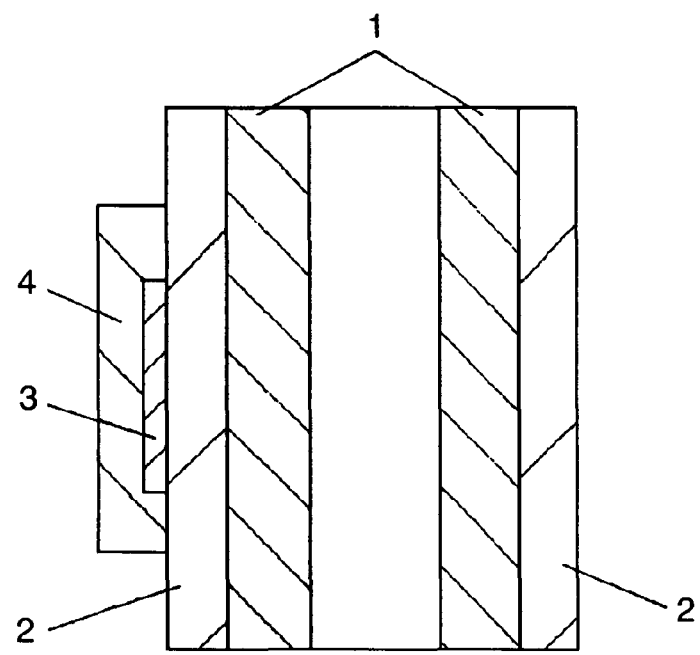
FIG. 18 is a sectional view of a conventional sensor.
Figure 19:
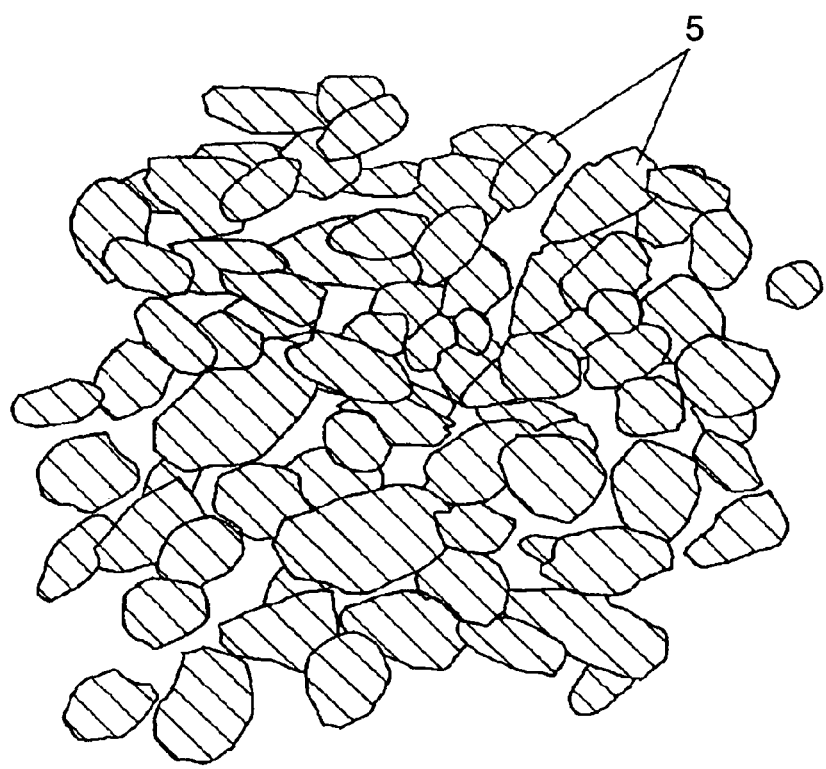
FIG. 19 is a partial sectional view of crystallized glass before baking in the conventional sensor.

In preferred embodiment 11, ceramic powder is added to CCG, and composite glass is formed as shown in FIG. 17. FIG. 17 is a schematic view showing a magnified section of composite glass formed by baking CCG and ceramic powder at the same time. Ceramic powder 34 is dispersed in CCG 19, and integrated with CCG 19, and forms composite glass 35. Thus, by adding ceramic powder to the CCG as a kind of filler, the cost of CCG can be lowered, and its strength and reliability can be enhanced. More specifically, the ceramic powder is preferably oxide or hydroxide of aluminum, magnesium, zirconium, calcium, or silicon. These oxides may be used (if hydroxides are used, they are transformed into oxides in the baking process). Part of such materials is contained also in CCG, but by adding as ceramic powder, the coefficient of thermal expansion and other properties can be adjusted. Since the ceramic powder is added in a form of oxide or hydroxide, it is easy to distinguish ceramic powder 34 from CCG in the finished composite glass. For example, by element analysis of section of composite glass by XMA or the like, ceramic powder 34 is detected as two-component powder (or block) composed of single metal (for example, Al, Mg, Ca, Si) and oxygen. On the other hand, CCG 19 is detected as composition of three components or more as shown in Table 8 and others. Thus, crystallized glass components and ceramic powder in the composite glass can be clearly distinguished.

Composite glass is formed preferably by using composite glass paste of plural glass powder materials for forming CCG and ceramic powder dispersed simultaneously in resin solution. By baking such composite glass paste on the metal substrate, a homogeneous composite glass can be formed on the metal substrate. Ceramic powder added in the composite glass paste is uniformly dispersed in the composite glass paste, and it is expected to lessen sudden temperature changes (endothermic, exothermic changes) when the glass powder is melted or crystallized. When the composite glass paste is baked on specified metal substrate 11, composite glass is formed.

Average particle size of ceramic powder 34, or oxide powder or hydroxide powder is preferably 0.1 to 10 µm. If average particle size of ceramic powder 34 is less than 0.05 µm, the ceramic powder 34 is expensive, and it is hard to disperse uniformly as a component of composite glass paste. If average particle size of ceramic powder 34 is more than 15 µm, its size may have effect on the thickness of composite glass layer. Average particle size of plural glass powder materials for composing CCG is preferred to be in a range of 0.5 to 10 µm.

When average particle size of glass powder is less than 0.3 µm, uniform dispersion of glass powder materials may be difficult. When using a single glass powder material, in particular, it can be used if average particle size is in a range of 0.1 to 10 µm. This is because fine glass powder of about 0.1 to 3 µm (glass powder is more likely to aggregate at smaller size of less than 0.3 µm), if forming aggregates of about 5 to 10 µm, forms uniform (same) crystallized glass when baked.

In the case of CCG of the invention, on the other hand, since different glass powder materials are baked at the same time, preferably, first crystallized powder 25 and second crystallized powder 26 should be mixed and dispersed uniformly as shown in FIG. 5. Accordingly, average particle size is preferred to be 0.5 μm or more. If average particle size of glass powder exceeds 10 μm, in addition to thickness of CCG, it is estimated that the particle size of glass powder has an influential effect (when average particle size exceeds 10 μm, it is high possible that large glass powder particles of 20 μm or 30 μm in diameter may be contained). Content of ceramic powder in composite glass is preferably 3 to 30 wt. %. In 100 parts by weight of crystallized glass powder, the content of ceramic powder is preferred to be 1 to 30 parts by weight. If content of ceramic powder is less than 1 part by weight, the effect of addition of ceramic powder may be too small. If exceeding 30 parts by weight, the content of CCG in composite glass is lowered by the corresponding portion, and the sintering property of the finished composite glass may be inferior.

In the sectional structural diagram of sensor shown in FIG. 1, FIG. 10, FIG. 11, and FIG. 12, the CCG is preferably a composite glass composed of CCG and ceramic powder. By using such inexpensive commercial ceramic powder, the material cost of the sensor is saved.

Size of metal substrate is free in a range of a square of several millimeters to a square of tens of centimeters. When measuring a strain of a large substrate, the sensor can be fixed to the large substrate by using screws through holes 32 formed in the metal substrate 11 as shown in FIG. 14.

Preferred Embodiment 12

Preferred embodiment 12 relates to a strain sensitive resistor. The strain sensitive resistor used in the invention is mainly composed of PbO as resistor material, and it is dispersed in glass mainly composed of PbO and $SiO_2$. The strain sensitive resistor is preferred to contain ruthenium oxide by 5 to 50 wt. %. If content of ruthenium oxide is less than 5 wt. %, specified resistance value may not be obtained. If content of ruthenium oxide exceeds 50 wt. %, the resistance value is too low, and the material cost is increased.

Content of lead oxide (PbO) is preferred to be 20 to 70 wt. %. If content of lead oxide is less than 20 wt. %, specified characteristic may not be obtained. If content of lead oxide is more than 70 wt. %, contents of $RuO_2$ and other additives are relatively lowered, and specified characteristic may not be obtained on the whole as strain sensitive resistor. As required, $SiO_2$ is preferably added in a range of 1 to 20 wt. %. If content of $SiO_2$ is less than 1 wt. %, specified characteristic as strain sensitive resistor may not be obtained. If content of $SiO_2$ is more than 20 wt. %, it may have an effect on sintering property. In addition, $B_2O_3$ may be preferably added by 1 to 40 wt. %. If content of $B_2O_3$ is less than 1 wt. % or more than 40 wt. %, specified GF value may not be obtained. In such composition analysis, a general material analysis technique known as fluorescent X-ray analysis or ICP-AES may be employed. By dispersing such powder of ruthenium oxide or PbO in resin solution, a strain sensitive resistor paste is prepared. Baking temperature of strain sensitive resistor paste is preferably 500 to 950° C. If baking temperature of strain sensitive resistor paste is less than 500° C., binder removal is insufficient, and the characteristic of resistor may be influenced. If baking temperature of strain sensitive resistor paste is more than 950° C., the characteristic of resistor may be unstable.

The strain sensitive resistor 13 constitutes a specified bridge circuit together with wiring 20. In this case, it is preferred to form a Wheatstone bridge by using a plurality of strain sensitive resistors 13, preferably four. In this case, the resistance values of the plurality of strain sensitive resistors 13 are preferred to be close to each other. In particular, when the mutual resistance values are defined within a range of plus or minus 5%, it is easier to compose the bridge circuit. If the mutual resistance values exceeds the scope of plus or minus 5%, the stability of bridge circuit may be inferior. The range of resistance values is a variation to the average of a plurality of resistors (the variation is expressed in formula $3\sigma/x$, where σ is standard deviation, and x is the mean), and it is also preferred to be within plus or minus 5%. By controlling the variation of resistance values below 5%, the product yield is enhanced.

Preferred Embodiment 13

Preferred embodiment 13 is explained by referring to the drawing.

In preferred embodiment 13, a manufacturing method of strain sensor using the CCG shown in FIG. 1 is explained. First, plural crystallized glass materials differing in crystallizing temperature are prepared. Uniform dispersion of individual glass powder materials for composing the CCG and forming method are described. To obtain a homogeneous CCG, glass powder materials different in compositions are formed in a homogeneous state on a metal substrate in a specified shape.

In this forming method, glass powder is dispersed in specified resin solution to prepare glass paste, and it is directly applied on the metal substrate by screen printing or other method and formed in specified shape and dried, and baked at specified temperature. At this time, the glass paste is prepared by fabricating plural types of glass paste depending on the type and product number of glass powder, and the prepared plural types of glass paste (containing different glass powder particles) are weighed and blended. By blending plural glass paste materials, a desired CCG paste can be manufactured.

When manufacturing the glass paste, plural types of glass powder may be prepared from the beginning, and weighed at specified rate, and dispersed in specified resin solution, and CCG paste may be prepared. In particular, in the case of CCG, it is required to disperse different crystallized glass materials uniformly. If dispersion is not uniform, the finished CCG may include uneven crystal deposition or uneven density.

Organic solvent used in CCG paste is preferably selected from fourth category of hazardous substances in division of hazardous substances according to Fire Service Law, in consideration of ease of handling in printing, especially class 2 petroleum or class 3 petroleum (class 3 petroleum is preferable from the viewpoint of ease of handling, and class 4 petroleum is too low in drying, and is poor in productivity). In particular, water-insoluble liquid is selected from class 3 petroleum. Examples of such solvent include BCA (butyl carbitol acetate), α terpineol, and other organic solvents. Among water-soluble liquids classified in class 3 petroleum, BC (butyl carbitol) and other water-soluble liquids may contain water by nature, or may absorb moisture during storage. As a result, the pot life of CCG paste may be shortened. This problem is specifically discussed below.

First, several types of crystallized glass powder of MgO—$B_2O_3$—$SiO_2$ system shown in Table 8 were selected. Specified raw material powder was melted at high temperature in melting furnace, and quenched, ground and sorted so as not to be crystallized. Sorting by air (wind) is preferred. In the case of wet sorting, glass powder may absorb moisture to be cured and aggregated. Thus, plural types of crystallized glass powder different in blending ratio were manufactured. Average particle size of these crystallized glass powder materials was about 2 to 10 μm.

When manufacturing glass paste, average particle size is preferred to be 10 μm or less. If less than 2 μm, the grinding cost or sorting yield may push up the manufacturing cost. If average particle size is more than 20 μm, large glass particles of tens of microns may be mixed in, and such large particles may cause clogging of screen mesh at the time of screen printing of glass paste in specified pattern.

The manufactured glass paste was printed on the metal substrate in specified shape, and baked, and a CCG 19 was fabricated.

In particular, as in the case of the invention, when forming a CCG as insulator glass on a metal elastic body, since the coefficient of thermal expansion of the metal is large (10.4 ppm/° C. in SUS430, 17.3 ppm/° C. in SUS304), a large coefficient of thermal expansion is needed in the CCG. For this purpose, it is desired to contain elements of large coefficient of thermal expansion such as MgO, BaO, or $Al_2O_3$. However, such constituent members include those high in moisture absorption (for example, BaO is used as desiccant and is high in moisture absorption). Further, by absorption of moisture, crystallized glass powder as material powder of CCG paste may absorb moisture and be cured. As countermeasure, solvent for CCG paste is preferred to be low in moisture absorption, and specifically an organic solvent low in compatibility with water is desired.

Such glass was dispersed in resin solution of ethyl cellulose dissolved in organic solvent by using three rolls, and CCG paste was prepared. The CCG paste was printed on metal substrate in specified pattern by using screen printing machine, and dried at 200° C.

It was set in MCF, and baked in oxidizing atmosphere of in/out 60 minutes at peak temperature of 850° C. By baking plural seeds of crystallized glass in batch, CCG 19 as shown in FIG. 1 was formed. A commercial electrode paste was printed thereon in specified pattern, and baked, and wirings 20 as shown in FIG. 1 were formed. To connect between plural wirings 20, strain sensitive resistance paste was printed in specified pattern, and baked, and a strain sensitive resistor 13 as shown in FIG. 1 was formed. To cover the entire surface of strain sensitive resistor 13 and part of wirings 20, an overcoat 14 was formed. Finally, semiconductor chips, components and connectors were mounted, and a strain sensor was completed.

In the invention, plural types of crystallized glass powder are blended by specified rate and baked in batch to form CCG, and the sinter adhesion to the metal substrate 11 is enhanced. As a result, the proof stress of the strain sensor is enhanced, while the cost is lowered. As plural seeds of crystallized glass powder, aside from those different in crystallizing temperature, crystallized glass powder materials different in coefficient of thermal expansion in a range of $100 \times 10^{-7}$ or less may be used. In the invention, plural types of crystallized glass powder are blended by specified rate and baked in batch to form CCG, and the coefficient of thermal expansion can be optimized for the metal substrate 11 having various coefficients of thermal expansion. Thus, the proof stress of the strain sensor is enhanced, and the cost is lowered.

Preferably, average particle size of crystallized glass powder is 0.5 to 20 μm. Manufacture of crystallized glass powder of average particle size of less than 0.5 μm is very costly because of grinding expenses and sorting expenses. If average particle size is more than 20 μm, the sinter may not be homogenous sufficiently. Difference in average particle size of plural types of crystallized glass is preferably 5 μm or less. If difference in particle size is more than 5 μm, adverse effects may occur in homogeneity of CCG paste or homogeneity of sinter.

Difference in crystallizing temperatures of plural crystallized glass materials is preferred to be 50° C. or less. If difference in crystallizing temperatures exceeds 50° C., adverse effects may occur in homogeneity of sinter.

Thickness of glass paste after drying is preferred to be 15 to 250 μm. In this range, thickness of CCG after baking of glass paste is 10 to 200 μm, and a specified characteristic may be obtained. If thickness of glass paste after drying is less than 15 μm or if thickness of crystallized glass after baking is less than 10 μm, effects of pinholes and others may occur. If thickness of glass paste after drying is more than 250 μm or if thickness of crystallized glass after baking is more than 200 μm, these material expenses may push up the product cost.

Concentration of crystallized glass powder in CCG paste is preferred to be 40 to 80 wt. %. If concentration of crystallized glass powder in CCG paste is less than 40 wt. %, voids are likely to be formed in the finished CCG. If exceeding 80 wt. %, the fluidity of paste, leveling performance or printing performance may be inferior.

Viscosity of CCG paste is preferred to be 100 to 2000 poise in a slip speed range of 1 to 100/s (/s is the unit of slip speed, and is a reciprocal number of second). If the slip speed is less than 1/s, it is hard to measure the viscosity at high precision. If the slip speed is more than 100/s, if a rheometer of cone plate type is used, air is likely to be entrapped between cone and plate, and it is hard to measure the viscosity at high precision. If the viscosity is less than 10 poise, it is hard to print pattern of high precision on the metal substrate 11 (the viscosity is too low, and the pattern is likely to run or blur). If the viscosity is more than 200 poise, the viscosity is too high, and pinholes due to screen mesh after screen printing are likely to appear, and leveling may be difficult.

In this preferred embodiment, plural crystallized glass materials may be different at least in one of crystallizing temperature, coefficient of thermal expansion, and transition point temperature. For example, when the coefficient of thermal expansion differs in a range of $100 \times 10^{-7}/°$ C., the crystallizing temperature and transition point temperature may not be particularly different.

Preferred Embodiment 14

Preferred embodiment 14 relates to a manufacturing method of strain sensor incorporating an internal electrode shown in FIG. 10. First, plural types of crystallized glass powder having different crystallizing temperatures were prepared. The powder was dispersed in resin solution, and glass paste was prepared, and it was printed and dried in a specified shape on the metal substrate 11 as shown in FIG. 10. A commercial electrode paste mainly composed of Ag was printed and dried further thereon as internal electrode.

To cover the electrode paste, the glass paste was printed and dried. A laminate formed of glass paste and electrode paste was formed, and plural layers of the laminate were baked in batch. As shown in FIG. 10, wiring 20 and strain sensitive resistor 13 were formed, and overcoat 14 was further formed. Finally, semiconductors, chip components and connectors were mounted.

Noise characteristic was measured in this sample, and the noise resistance was higher than that of the structure shown in FIG. 1. For example, by connecting part of wiring 20 to the internal electrode 27, the wiring impedance can be lowered, and voltage fluctuations due to EMI (electromagnetic interference) can be decreased. By lifting the internal electrode 27 from the metal substrate 11, noise entry from the metal substrate 11 can be prevented. Thickness of internal electrode is preferred to be 0.5 to 30 μm. If thickness of internal electrode is less than 0.5 μm, the electrode after sintering is likely to be broken, and noise resistance effect may not be obtained. If the thickness exceeds 30 μm, the product cost is increased. Preferably, the internal electrode is made of electrode paste having conductive powder mainly composed of silver dispersed in resin solution. Baking temperature of internal electrode is preferred to be 500 to 950° C. By baking the internal electrode in this temperature range, the CCG powder formed adjacently to the internal electrode can be baked at the same time, and the baking cost is saved. The wiring 20 connected to the strain sensitive resistor may be also made of electrode paste having conductive powder mainly composed of silver dispersed in resin solution.

By baking such electrode paste at 500 to 950° C., the adjacent glass material and strain sensitive resistor can be baked in batch, and the baking cost is saved. By adding palladium (Pd) in a range of 5 to 20 wt. % to the wiring 20 mainly composed of silver, solder loss at the time of mounting of components can be prevented. Further, by adding platinum (Pt) in a range of 5 to 20 wt. % similarly, the solder mounting performance when using lead-free solder can be enhanced. If the rate of Pd or Pt is less than 5 wt. %, the solder loss preventive effect may be insufficient. The content of Pd or Pt is as much as possible for improving the soldering performance, but if exceeding 20 wt. %, the material cost is increased.

Difference in crystallizing temperatures of plural crystallized glass materials is preferred to be 50° C. or less. If difference in crystallizing temperatures exceeds 50° C., adverse effects may occur in homogeneity of sinter. By adding elements common to CCG or noncrystalline glass (for example, $SiO_2$, $Al_2O_3$) by a specific rate, plural layers made of dissimilar materials can be baked in batch, and the manufacturing cost is saved. In this preferred embodiment, too, plural crystallized glass materials may be different at least in one of crystallizing temperature, coefficient of thermal expansion, and transition point temperature. For example, when the coefficient of thermal expansion differs in a range of $100 \times 10^{-7}$/° C., the crystallizing temperature and transition point temperature may not be particularly different.

Preferred Embodiment 15

Preferred embodiment 15 relates to a manufacturing method of strain sensor shown in FIG. 12. First, plural types of crystallized glass powder having different crystallizing temperatures were prepared. The powder was dispersed uniformly in resin solution, and CCG paste was prepared. Noncrystalline glass powder was uniformly dispersed in resin solution, and noncrystalline glass paste was prepared. First, the CCG paste was printed and dried in a specified shape on the metal substrate 11. Thereon, an electrode paste for forming internal electrode 27 was printed and dried in a specified shape. Further thereon, the CCG paste was printed and dried in a specified shape. Still more, the noncrystalline glass paste was printed and dried in a specified shape. These plural layers were baked in batch. As shown in FIG. 12, wiring 20 and strain sensitive resistor 13 were formed thereon, and overcoat 14 was further formed. Finally, semiconductors, chip components and connectors were mounted. The characteristic of the completed strain sensor was investigated, and in spite of the same strain sensitive resistor 13 as used in preferred embodiments 14 to 16, a higher GF value was obtained. As required, noncrystalline glass 30 may be formed between the strain sensitive resistor 13 and the CCG.

The noncrystalline glass is, preferably noncrystalline glass in the composition of 40 to 80 wt. % of $SiO_2$, 5 to 15 wt. % of CaO, 3 to 15 wt. % of PbO, 1 to 20 wt. % of $Al_2O_3$, and 1 to 20 wt. % of $ZrO_2$ as shown in Table 9. If $SiO_2$ is less than 40 wt. %, the sintering performance may be inferior. If CaO is less than 5 wt. %, too, the sintering performance may be inferior. If PbO is less than 3 wt. %, adverse effects may occur on the resistance value or GF of the strain sensitive resistor to be formed thereon. If $Al_2O_3$ is less than 1 wt. %, since $Al_2O_3$ is contained in the base layer of CCG, mutual matching property may be disturbed. If $ZrO_2$ is less than 1 wt. %, the coefficient of thermal expansion of noncrystalline glass may be lowered. If $SiO_2$ is more than 80 wt. %, the glass melting temperature may be to high. If CaO is more than 15 wt. %, the glass sintering performance may be changed. If PbO is more than 15 wt. %, adverse effects may occur on the characteristic of the strain sensitive resistor to be formed thereon. If $Al_2O_3$ is more than 20 wt. %, the glass sintering performance or glass surface smoothness may be inferior. If $ZrO_2$ is more than 20 wt. %, the glass sintering performance or glass surface smoothness may be inferior same as in the case of excessive addition of $Al_2O_3$. As required, $B_2O_3$ may be added to the noncrystalline glass.

In this preferred embodiment, too, plural crystallized glass materials may be different at least in one of crystallizing temperature, coefficient of thermal expansion, and transition point temperature. For example, when the coefficient of thermal expansion differs in a range of $100 \times 10^{-7}$/° C., the crystallizing temperature and transition point temperature may not be particularly different.

Preferred Embodiment 16

Preferred embodiment 16 relates to a manufacturing method of strain sensor using composite glass shown in FIG. 17. First, plural types of crystallized glass powder having different crystallizing temperatures were prepared. As ceramic powder, commercial alumina powder was added, and dispersed uniformly in specified resin solution, and composite glass paste was prepared. It was printed and baked in specified shape on the metal substrate 11, and composite glass 35 was fabricated. Thus, instead of the CCG 19 in FIG. 1, the composite glass 35 was used. Next, as shown in FIG. 1, wiring 20, strain sensitive resistor 13, and overcoat 14 were formed, and specified components were mounted, and a strain sensor was completed. In this strain sensor, since part of crystallized glass powder was replaced by an inexpensive ceramic powder, and the material cost of the product is saved. The content of ceramic powder in 100 parts by weight of crystallized glass powder is preferably 1 part by weight or more to 30 parts by weight or less. If the content of ceramic powder is less than 1 part by weight, effect of addition of ceramic powder may not be obtained. If exceeding 30 parts by weight, the composite glass formed by simultaneous sintering of CCG and ceramic powder may be inferior in sintering performance.

Difference in crystallizing temperatures of plural crystallized glass materials is preferred to be 50° C. or less. If difference in crystallizing temperatures exceeds 50° C., adverse effects may occur in homogeneity of sinter.

In this preferred embodiment, too, plural crystallized glass materials may be different at least in one of crystallizing temperature, coefficient of thermal expansion, and transition point temperature. For example, when the coefficient of thermal expansion differs in a range of $100 \times 10^{-7}$/° C., the crystallizing temperature and transition point temperature may not be particularly different.

INDUSTRIAL APPLICABILITY

In the invention, since a CCG material of high sintering stability is used as the insulator material, a sensor and various strain sensors realizing low cost and reduction of characteristic fluctuations can be presented.

The invention claimed is:

1. A strain sensor comprising:
a substrate;
a crystallized glass laminated on the substrate;
a strain sensitive resistor laminated on the crystallized glass; and
a noncrystalline glass interposed between the crystallized glass and the strain sensitive resistor,
wherein the crystallized glass is a composite crystallized glass formed by baking plural types of crystallized glass powder mutually different in thermomechanical constant.

2. The strain sensor of claim 1, wherein the thermomechanical constant is a crystallizing temperature.

3. The strain sensor of claim 2, wherein the crystallized glass powder further contains at least one of ceramic powder and noncrystalline glass powder.

4. The strain sensor of claim 1, wherein the thermomechanical constant is a coefficient of thermal expansion.

5. The strain sensor of claim 4, wherein the crystallized glass powder further contains at least one of ceramic powder and noncrystalline glass powder.

6. The strain sensor of claim 1, wherein the thermomechanical constant is a transition point temperature.

7. The strain sensor of claim 6, wherein the crystallized glass powder further contains at least one of ceramic powder and noncrystalline glass powder.

8. The strain sensor of claim 1, wherein the substrate is a metal substrate.

9. The strain sensor of claim 1, wherein the noncrystalline glass is 5 to 50 μm.

10. The strain sensor of claim 1, wherein a plurality of the strain sensitive resistors are formed to constitute a bridge circuit by way of wiring, and the mutual resistance values are within a range of plus or minus 5%.

11. The strain sensor of claim 1, wherein an internal electrode of thickness of 0.5 to 30 μm is embedded inside of the composite crystallized glass.

12. The strain sensor of claim 1, wherein the composite crystallized glass is formed by baking plural types of crystallized glass powder forming crystal seeds composed of at least two elements or more selected from the group of Ba, Mg, and Si.

13. The strain sensor of claim 12, wherein the composite crystallized glass powder forms crystal seeds composed of $BaMg_2SiO_7$.

14. The strain sensor of claim 1, wherein the composition of different types of crystallized glass powder is composed of MgO by 35 to 50 wt. %, $B_2O_3$ by 10 to 30 wt. %, $SiO_2$ by 10 to 25 wt. %, BaO by 3 to 25 wt. %, $Al_2O_3$ by 1 to 30 wt. %, $SnO_2$ by 1 to 5 wt. %, and $P_2O_5$ by 5 wt. % or less, and at least one of the differences in contents of the group consisting of MgO, BaO, and $Al_2O_3$ is in a range of 1 to 20 wt. %.

15. The strain sensor of claim 1, wherein the composition of different types of crystallized glass powder is composed of MgO by 35 to 50 wt. %, $B_2O_3$ by 10 to 30 wt. %, $SiO_2$ by 10 to 25 wt. %, BaO by 3 to 25 wt. %, $Al_2O_3$ by 1 to 30 wt. %, $SnO_2$ by 1 to 5 wt. %, and $P_2O_5$ by 5 wt. % or less, and the difference in contents of $SiO_2$ and $B_3O_3$ is in a range of 0.1 to 10 wt. %.

16. The strain sensor of claim 1, wherein the average particle size of plural types of crystallized glass powder is 0.5 to 20 μm.

17. The strain sensor of claim 16, wherein the difference in the average particles sizes of plural types of crystallized glass powder is 5 μm or less.

18. The strain sensor of any one of claims 3 to 7, wherein the noncrystalline glass is composed of $SiO_2$ by 40 to 80 wt. %, CaO by 5 to 15 wt. %, PbO by 3 to 15 wt. %, $Al_2O_3$ by 1 to 20 wt. %, and $ZrO_2$ by 1 to 20 wt. %.

19. The strain sensor of any one of claims 3 to 7, wherein the content of the ceramic powder is 1 to 30 parts by weight in 100 parts by weight of the crystallized glass powder.

20. The strain sensor of any one of claims 3 to 7, wherein the ceramic powder is oxide or hydroxide of average particle size of 0.1 to 10 μm.

21. The strain sensor of any one of claims 3 to 7, wherein the ceramic powder is at least one oxide or hydroxide of the group consisting of aluminum, magnesium, zirconium, calcium, and silicon.

* * * * *